(12) United States Patent
Oliveira et al.

(10) Patent No.: US 6,889,309 B1
(45) Date of Patent: May 3, 2005

(54) METHOD AND APPARATUS FOR IMPLEMENTING AN ENTERPRISE VIRTUAL STORAGE SYSTEM

(75) Inventors: Fernando Oliveira, Sudbury, MA (US); Helen S. Raizen, Jamaica Plain, MA (US); Kevin Rodgers, Derry, NH (US)

(73) Assignee: EMC Corporation, Hopkington, MA (US)

( * ) Notice: Subject to any disclaimer, the term of this patent is extended or adjusted under 35 U.S.C. 154(b) by 350 days.

(21) Appl. No.: 10/122,601

(22) Filed: Apr. 15, 2002

(51) Int. Cl.[7] .................................. G06F 12/08
(52) U.S. Cl. ............................ 711/203; 711/6
(58) Field of Search ................. 711/6, 203; 345/568

(56) References Cited

U.S. PATENT DOCUMENTS

| | | | | |
|---|---|---|---|---|
| 5,577,231 A | * | 11/1996 | Scalzi et al. ............. | 703/26 |
| 5,897,661 A | * | 4/1999 | Baranovsky et al. ....... | 711/170 |
| 5,948,062 A | | 9/1999 | Tzelnic et al. | |
| 6,047,294 A | * | 4/2000 | Deshayes et al. ......... | 707/204 |
| 6,216,202 B1 | * | 4/2001 | D'Errico .................. | 711/112 |
| 6,732,104 B1 | * | 5/2004 | Weber ..................... | 707/10 |
| 6,766,359 B1 | * | 7/2004 | Oliveira et al. ........... | 709/213 |
| 2002/0019909 A1 | * | 2/2002 | D'Errico .................. | 711/114 |
| 2002/0161983 A1 | * | 10/2002 | Milos et al. .............. | 711/202 |
| 2003/0115406 A1 | * | 6/2003 | Fought et al. ............. | 711/112 |
| 2004/0044698 A1 | * | 3/2004 | Ebata et al. .............. | 707/200 |
| 2004/0078644 A1 | * | 4/2004 | Fujibayashi et al. ........ | 714/6 |

OTHER PUBLICATIONS

PCT Written Opinion (PCT Rule 66), Sep. 23, 2004.
International Search Report.
IBM Redbooks, "Storage Networking Virtualization What's it all about? December 2000.

* cited by examiner

*Primary Examiner*—Matthew Kim
*Assistant Examiner*—Hetul Patel
(74) *Attorney, Agent, or Firm*—Wolf, Greenfield & Sacks, P.C.

(57) ABSTRACT

One embodiment is a method and apparatus for managing a virtual data storage object in a computer system including at least one host and at least one storage device that present at least one storage disk to the host as a storage resource. The host includes at least one of an LVM and a file system. The virtual data storage object is created so that at least one of a logical volume and a file is employed as a storage resource to store data stored to the virtual data storage object. Another embodiment forms a virtual data storage object with data images stored on logical volumes from LVMs on different hosts. A further embodiment forms a virtual data storage object with one data image stored to a disk and another stored to a logical volume. Another embodiment is directed to a method and apparatus for distributing the metadata that defines a virtual storage object about the computer system.

83 Claims, 9 Drawing Sheets

METHOD AND APPARATUS FOR IMPLEMENTING AN ENTERPRISE VIRTUAL STORAGE SYSTEM

FIELD OF THE INVENTION

The present invention is directed to the area of computer system storage, particularly in a network environment.

BACKGROUND OF THE INVENTION

Most computer or data processing systems include one or more host computers (e.g., servers) and one or more storage systems that store data accessed by the hosts. Conventionally, volumes of storage stored on a storage system are treated as peripherals to the host, which carries with it several implications. First, the host appears to own the data that it stores in storage volumes that are specifically assigned to the host. Second, the host typically is responsible for management (e.g., protection, replication, migration, etc.) of data that is stored on the storage volumes allocated to the host. Third, the host typically determines the placement and layout of its data across the storage volumes assigned to it. Fourth, storage volumes are perceived as being assigned to particular physical storage systems.

More recently, the concept of storage virtualization in a network environment has been proposed, see e.g., Storage Networking Virtualization, by Blunden, Berx-Debeys and Sim, IBM Redbooks (December 2000). Storage virtualization employs a different data-centric model in which storage units are no longer perceived as peripherals assigned to a particular host or physical storage device. Under this model, host devices need not be aware of the physical placement or layout of data. Thus, management of the data may be moved away from individual hosts, and can be built into a storage infrastructure, e.g., comprised of a number of storage systems connected over a storage area network (SAN).

It is an object of the present invention to provide a method and apparatus for implementing storage virtualization.

SUMMARY OF THE INVENTION

One embodiment of the invention is directed to a method of managing a virtual data storage object in a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource and a file system that presents at least one file to other layers in the host as a storage resource. The method comprises acts of: (A) creating the virtual data storage object to be independent of any particular host and any particular storage device; and (B) creating the virtual data storage object so that at least one of the at least one logical volume and the at least one file is employed as a storage resource to store data stored to the virtual data storage object.

Another embodiment is directed to a computer readable medium for use in a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource and a file system that presents at least one file to other layers in the host as a storage resource. The computer readable medium is encoded with metadata defining a virtual data storage object that is independent of any particular host and any particular storage device in the computer system and that employs at least one of the at least one logical volume and the at least one file as a storage resource to store data stored to the virtual data storage object.

A further embodiment is directed to a computer readable medium encoded with a program for execution on a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource and a file system that presents at least one file to other layers in the host as a storage resource. The program, when executed, performs a method of managing a virtual data storage object, the method comprising acts of: (A) creating the virtual data storage object to be independent of any particular host and any particular storage device; and (B) creating the virtual data storage object so that at least one of the at least one logical volume and the at least one file is employed as a storage resource to store data stored to the virtual data storage object.

Another illustrative embodiment of the invention is directed to a control station for use in a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource and a file system that presents at least one file to other layers in the host as a storage resource, the control station to manage a virtual data storage object. The control station comprises a storage medium; and at least one controller that creates the virtual data storage object to be independent of any particular host and any particular storage device, and so that at least one of the at least one logical volume and the at least one file is employed as a storage resource to store data stored to the virtual data storage object.

A further illustrative embodiment is directed to a host computer for use in a computer system including the host computer and at least one storage device that stores data written by the host computer, the at least one storage device presenting at least one storage disk to the at least one host computer as a storage resource. The host computer comprises at least one software layer that issues access request to a virtual data storage object that is independent of the host computer and any particular storage device; at least one of a logical volume manager (LVM) that presents at least one logical volume to other software layers in the host as a storage resource and a file system that presents at least one file to other software layers in the host as a storage resource; and at least one conversion layer that converts the access requests directed to the virtual data storage object to access requests directed to at least one of the at least one logical volume and the at least one file.

Another illustrative embodiment of the invention is directed to a method for use in a computer system including at first and second hosts and at least one storage device that stores data written by the first and second hosts, the at least one storage device presenting at least one storage disk to the at least one host as a storage resource, the first host including a first logical volume manager (LVM) that presents at least one logical volume to other layers in the first host, the second host including a second LVM that presents at least one logical volume to other layers in the second host as a storage resource. The method comprising acts of: (A) creating a virtual data storage object that is independent of any particular host and any particular storage device, the virtual data storage object including first and second data images; (B) assigning the first data image to be stored on a logical volume presented by the first LVM; and (C) assigning the second data image to be stored on a logical volume presented by the second LVM.

A further illustrative embodiment is directed to a method for use in a computer system including at least one host and at least one storage device that stores data written by the at least one host, the at least one storage device presenting at least one storage disk to the at least one host as a storage resource, the at least one host including a logical volume manager (LVM) that presents at least one logical volume to other layers in the host as a storage resource. The method comprises acts of: (A) creating a virtual data storage object that is independent of any particular host and any particular storage device and includes first and second data images; (B) assigning the first data image to be stored on a logical volume presented by the LVM; and (C) assigning the second data image to be stored on a storage disk presented by the at least one storage device to the host.

Another illustrative embodiment is directed to a method for use in a computer system including at least one host and at least one storage device that stores data written by the at least one host. The method comprises acts of: (A) creating metadata defining a virtual data storage object that is independent of any particular host and any particular storage device; and (B) distributing the metadata about the computer system so that there is no central location that is the exclusive resource for accessing the metadata.

A further illustrative embodiment is directed to a computer readable medium encoded with a program for execution on a computer system including at least one host and at least one storage device that stores data written by the at least one host, the program, when executed, performs a method comprising acts of: (A) creating metadata defining a virtual data storage object that is independent of any particular host and any particular storage device; and (B) distributing the metadata about the computer system so that there is no central location that is the exclusive resource for accessing the metadata.

Another illustrative embodiment is directed to a control station for use in a computer system including at least one host and at least one storage device the control station comprising: a storage medium; and at least one controller that creates metadata defining a virtual data storage object that is independent of any particular host and any particular storage device, and distributes the metadata about the computer system so that there is no central location that is the exclusive resource for accessing the metadata.

A further illustrative embodiment is directed to a storage system for use in a computer system including at least one host and the storage system, the storage system to store data written by the at least one host, the at least one host storing a first copy of metadata for a virtual data storage object that is independent of any particular host and the storage system and that is stored using a storage resource on the storage system. The storage system comprises the storage resource; a storage medium that stores a second copy of the metadata; and at least one controller that notifies the at least one host when the second copy of the metadata is updated so that the host can update the first copy of the metadata.

Another illustrative embodiment of the invention is directed to a method of managing a virtual data storage object in a computer system including a host and at least one storage device that stores data written by the host, the at least one storage device presenting at least one storage disk to the host as a storage resource. The method comprises acts of: (A) creating the virtual data storage object to be independent of any particular host and any particular storage device and to comprise at least first and second data images; (B) presenting each of the first and second data images to host; and (C) performing a selection process within the host to select which of the first and second data images to employ in accessing the virtual data storage object.

A further illustrative embodiment is directed to a method of implementing a virtual data storage object in a computer system including at least one host and at least one storage device that stores data written by the at least one host, the virtual data storage object including at least one data image, at least one of the data image and the virtual data storage object having an attribute, the at least one storage device having at least one capability. The method comprises acts of: (A) considering the at least one capability of the at least one storage device when implementing the virtual data storage object; and (B) allocating at least one of the virtual data storage object and the at least one data image to be implemented on the at least one storage device so that the at least one capability of the at least one storage device is employed to implement the at least one attribute of the at least one of the virtual data storage object and the at least one data image.

Another illustrative embodiment is directed to a computer readable medium encoded with a program for execution on a computer system including at least one host and at least one storage device that stores data written by the at least one host, the program for implementing a virtual data storage object including at least one data image, at least one of the data image and the virtual data storage object having an attribute, the at least one storage device having at least one capability. The method comprises acts of (A) considering the at least one capability of the at least one storage device when implementing the virtual data storage object; and (B) allocating at least one of the virtual data storage object and the at least one data image to be implemented on the at least one storage device so that the at least one capability of the at least one storage device is employed to implement the at least one attribute of the at least one of the virtual data storage object and the at least one data image.

DETAILED DESCRIPTION

As mentioned above, one embodiment of the present invention is directed to a method and apparatus for implementing storage virtualization. The physical storage components on which storage virtualization can be implemented using the embodiments of the present invention described herein are not limited in any particular way, and can take any of numerous forms. For example, the physical storage components can include a plurality of storage systems (e.g., cached disk array systems) networked together over a storage area network (SAN), or any of a number of other devices.

Figure 1:
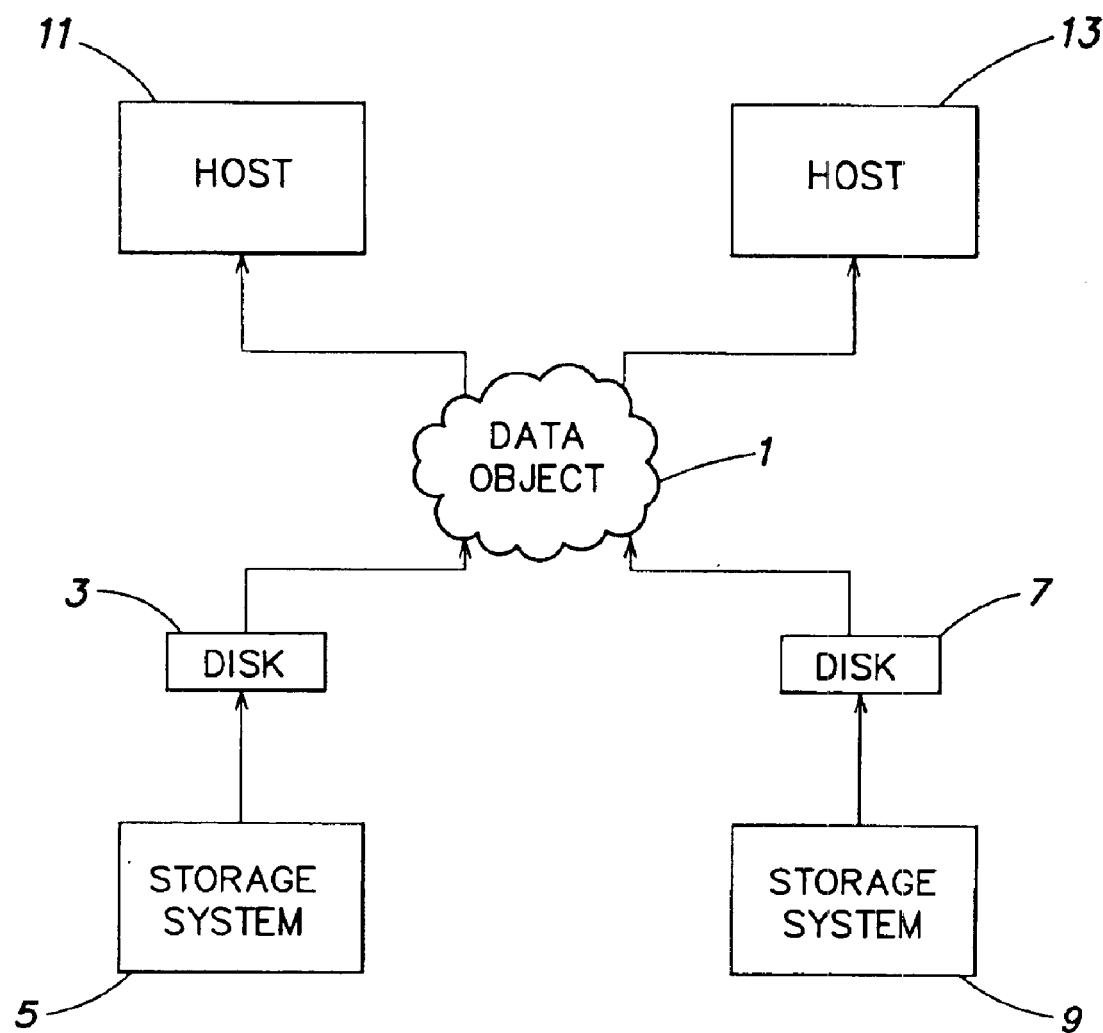
FIG. 1 is a block diagram of a computer system conceptually illustrating the virtualization of storage through the creation of a data object in accordance with one embodiment of the present invention.

The concept of storage virtualization, wherein a unit of storage is not constrained to a particular physical storage system nor owned by a particular host (i.e., it is independent of any particular host or storage system), is illustrated in FIG. 1. In the embodiment of the invention shown in FIG. 1, the virtualization of storage is centered around the creation of a unit of storage referred to as a data object. A data object is a virtual unit of storage that is comprised of one or more units of storage from one or more physical storage systems, but is managed and controlled independently from any physical storage system. In addition, a data object is presented to one or more hosts as a unit of storage to be used thereby, but is not owned or controlled by any particular host.

In the conceptual illustration of FIG. 1, a data object 1 has been created to serve as a unit of storage. The data object 1 is formed from two "disks" from different storage systems, i.e., a disk 3 from storage system 5 and disk 7 from storage system 9. As used herein, the reference to a "disk" as a storage unit for storing data within a data object can refer to either an actual physical storage device (e.g., a disk) on an associated storage system, or alternatively, can refer to a logical volume of storage exported from a storage system. In this respect, it will be appreciated by those skilled in the art that many storage systems (e.g., those from the SYMMETRIX line of storage systems available from EMC Corporation) are intelligent systems wherein a logical volume of storage exported by the storage system is not limited to being implemented on a single physical storage device, but rather, can be mapped across one or more physical storage devices within the storage system in a manner that is transparent to the computer system resources to which the logical volume is exported. The data in the data object 1 can be spread among the disks 3, 7 that are used to implement the data object 1 in any of numerous ways, as discussed in more detail below. For example, portions of the data object can be stored on each of the disks 3, 7, so that neither disk will store the complete set of data within the data object 1. Alternatively, each disk 3, 7 can include a full image of the data object 1, with coherency rules and protocols being defined (e.g., by the data object 1 itself) for the multiple images.

In the conceptual illustration shown in FIG. 1, the data object 1 is presented to a pair of hosts 11, 13, such that each of the hosts 11, 13 can use the unit of storage provided by the data object 1. It should be appreciated that the present invention is not limited to making a data object 1 available to two or more hosts, as data objects alternatively can be made available to only a single host. In accordance with one embodiment of the present invention, the data object 1 can present itself to the hosts 11, 13 as a disk, like the disks 3, 7, such that the hosts can make use of the storage unit provided by the data object in much the same manner as is conventionally done with disks of storage presented to a host. Alternatively, in accordance with other embodiments of the present invention discussed below, a data object can be presented to the host as different types of storage units.

When the data object 1 is created, a unique identification scheme can be employed so that the data object can be uniquely identified. That is, within any particular computer system, there may be a plurality of data objects, such that an identification scheme can be employed so that each can be uniquely identified. This can be accomplished in any of numerous ways, examples of which are discussed below.

A result of the virtualization that is accomplished through the creation of data objects is that hosts 11, 13 need no longer be aware of the physical location of units of storage (e.g., disks) assigned to them. Rather, hosts 11, 13 need only be aware of the unique identifiers assigned to the data objects allocated to them. Thus, the actual physical storage location for the data object 1 is transparent to the hosts 11, 13, which can be advantageous as discussed below.

The virtualization of storage through the creation of data objects provides a number of advantages. For example, since the physical storage location for a data object 1 is transparent to the hosts 11, 13, management of the physical storage for the data object can be moved away from individual hosts and built into the storage infrastructure (as discussed in more detail below), which allows data management to be centralized and to be controlled by a set of policies that enables the data storage to be managed more effectively than is conventionally done.

Furthermore, the physical storage locations for a data object can be dynamically allocated (and reallocated) in a manner that is transparent to the hosts. This virtualization of storage can be analogized, for example, to the worldwide web, wherein a universal domain naming scheme (URLs) is employed to essentially obscure from the user the actual computing and storage resources employed, giving the appearance that resources (e.g., HTML pages) are suspended in the Internet and accessible via their URLs independent of the underlying infrastructure used to implement them. In accordance with one embodiment of the present invention, a unique naming scheme for data objects can accomplish a similar result, such that a data object can be considered to be suspended in a storage infrastructure, with the hosts 11, 13 that access the data object being unaware of the particular storage resources that are used to implement the data object.

Figure 2:
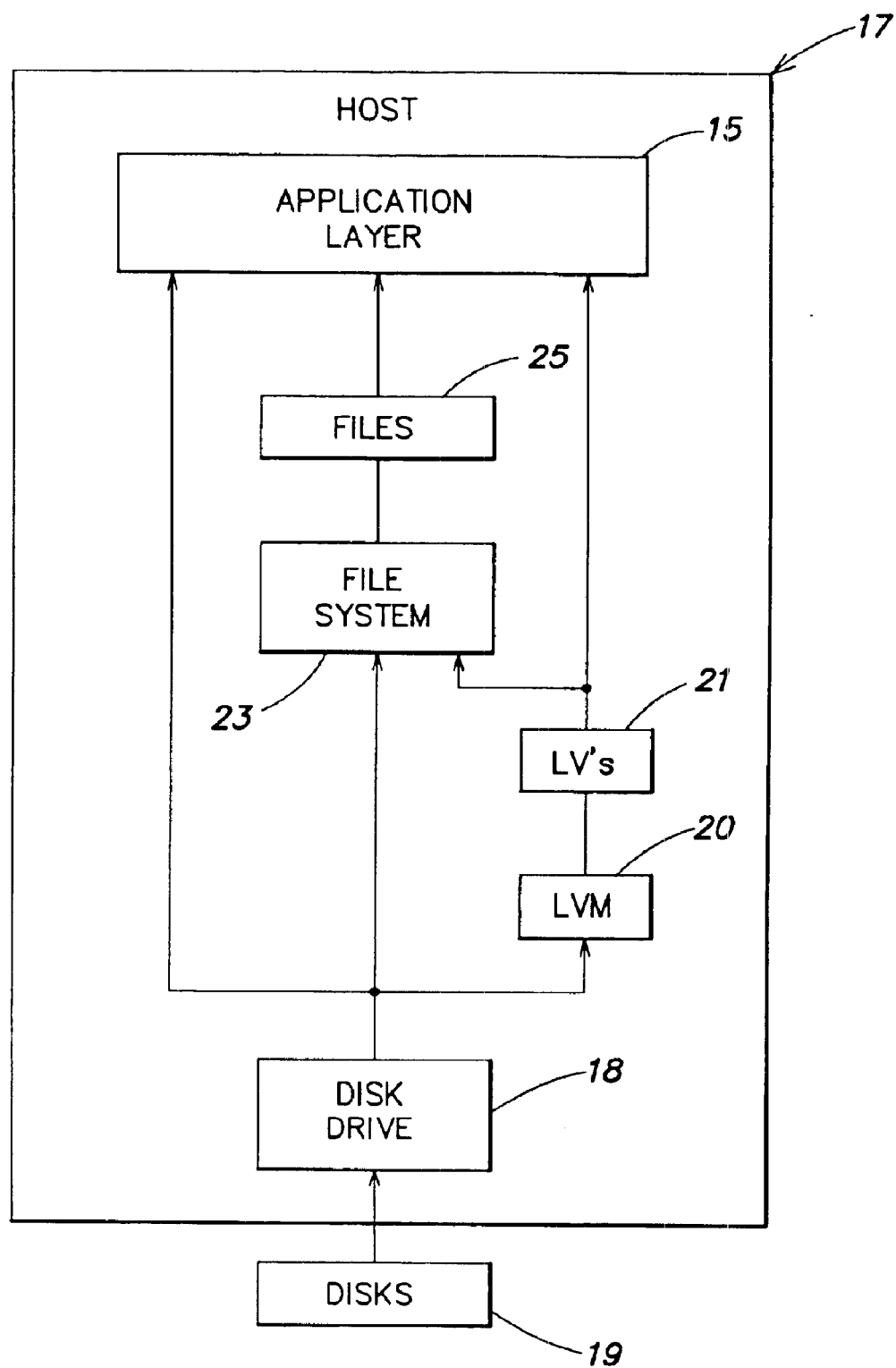
FIG. 2 is a block diagram conceptually illustrating the various types of storage resources that typically can be made available to various layers on a host.

In accordance with one embodiment of the present invention, tremendous flexibility is provided in the manner in which a data object is presented to applications executing on a host, as well as in the types of storage units that can be employed to form a data object. FIG. 2 conceptually illustrates the various types of storage units that typically can be made available to application programs executing in an application layer 15 on a host 17. First, in many host computer systems, application programs within application layer 15 can directly access raw disks 19 provided by a storage system, such as disks 3, 7 provided by storage systems 5, 9 in FIG. 1. In addition, many hosts 17 have logical volume managers (LVMs) 20 mounted thereon that manage disks 19 provided by storage systems. An LVM presents a number of units of storage referred to as logical volumes 21 to the application layer 15, and essentially provides a mapping function between a plurality of logical volumes 21 and a plurality of disks 19. In many computer systems, the logical volumes 21 can be presented directly to the application layer 15 as units of storage to be used thereby.

Finally, the host 17 further includes a file system 23 that provides another layer of mapping and presents files 25 to the application layer 15 as units of storage to be used thereby. As shown in FIG. 2, the file system 23 can accept disks 19 from one or more storage systems and/or logical volumes 21 from one or more LVMs. Thus, the file system 23 employs disks 19 and/or logical volumes 21 as units of storage and maps the files 25 across those storage units.

As illustrated in FIG. 2, the host 17 may include a software layer (typically referred to as a disk driver) 18 that presents the disks 19 to the application layer 15, file system 23 and the LVM 20.

In accordance with one embodiment of the present invention, a data object 1 (FIG. 1) can be presented to the host 17 as a disk 19 as discussed above, and can be managed internally within the host 17 in any of the ways in which disks 19 conventionally are managed. For example, a data object 1 can be presented as a disk directly to the application layer 15, can be presented as a disk to the file system 23, and/or can be presented as a disk to the LVM 20. In addition, the data object also can be presented to the application layer 15 as one of the logical volumes 21 or one of the files 25, and also can be presented to the file system 23 as one of the logical volumes 21.

The host's handling of data objects to present them to the application layer 15 as a disk 19, file 25 or logical volume 21 can be implemented in any of numerous ways, as the present invention is not limited to any particular implementation technique. In accordance with one embodiment of the present invention, a conversion or presentation layer can be provided on the host 17 that is capable of receiving data objects (e.g., it has the capability to interface with the particular identification scheme used for identifying data objects), and performing a name conversion on each data object so that it appears to the other layers in the host (e.g., the application layer 15, file system 23 and logical volume manager 20) as a disk 19. This advantageously requires no changes to any of the other host layers to enable them to be compatible with receiving a data object. Alternatively, or in addition, when it is desired to present a data object to the application layer 15 (or file system 23) as a logical volume 21, a specially adapted LVM can be added to the host 17 that is capable of directly receiving data objects and presenting them to the other layers in the host as logical volumes. In addition, when it is desired to present a data object to the application layer as a file 25, a specially adapted file system can be added to the file system layer 23. In this respect, it will be appreciated by those skilled in the art that the file system layer 23 typically includes a number of different file systems that are accessible in parallel, with a common access layer. In accordance with one embodiment of the present invention, a file system can be added to this file system layer 23 that is capable of directly receiving data objects and presenting them to the application layer 15 as files 25.

Defining A Data Object

Figure 3:
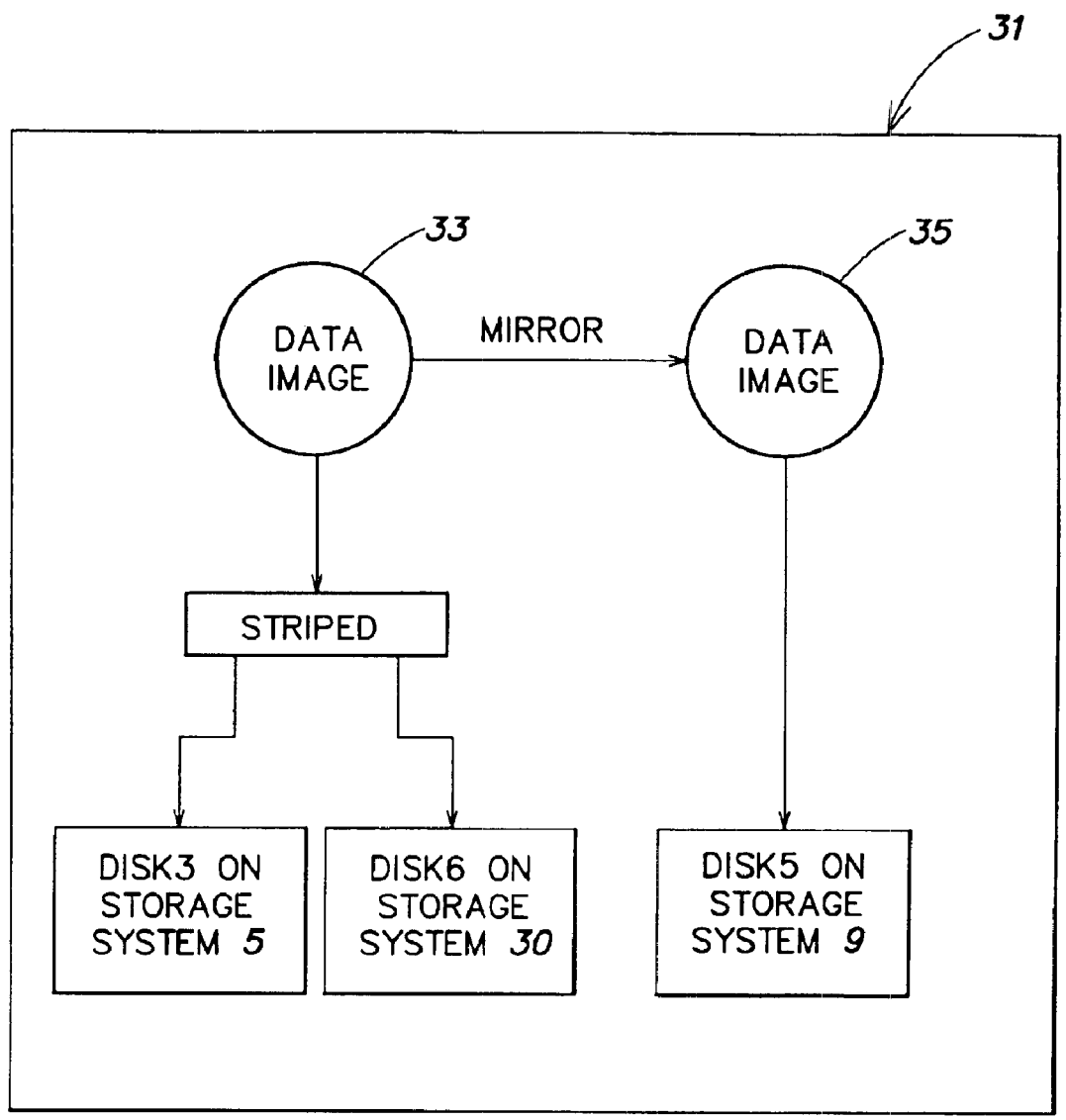
FIG. 3 is a conceptual illustration of a data object that can be formed in accordance with one embodiment of the present invention.

In accordance with one embodiment of the present invention, a data object can be conceptually considered to carry with it the definition of its structure, such that the data object is not controlled by any particular host. As shown in FIG. 3, the data object may have two or more data images, each of which may include a complete copy of the data within the data object. In the embodiment shown in FIG. 3, a data object 31 includes a pair of data images 33, 35, with the data image 35 being a mirrored copy of the data image 33. The data object 31 further includes structure defining the physical storage locations on which each of the data images 33, 35 is stored.

Figure 4:
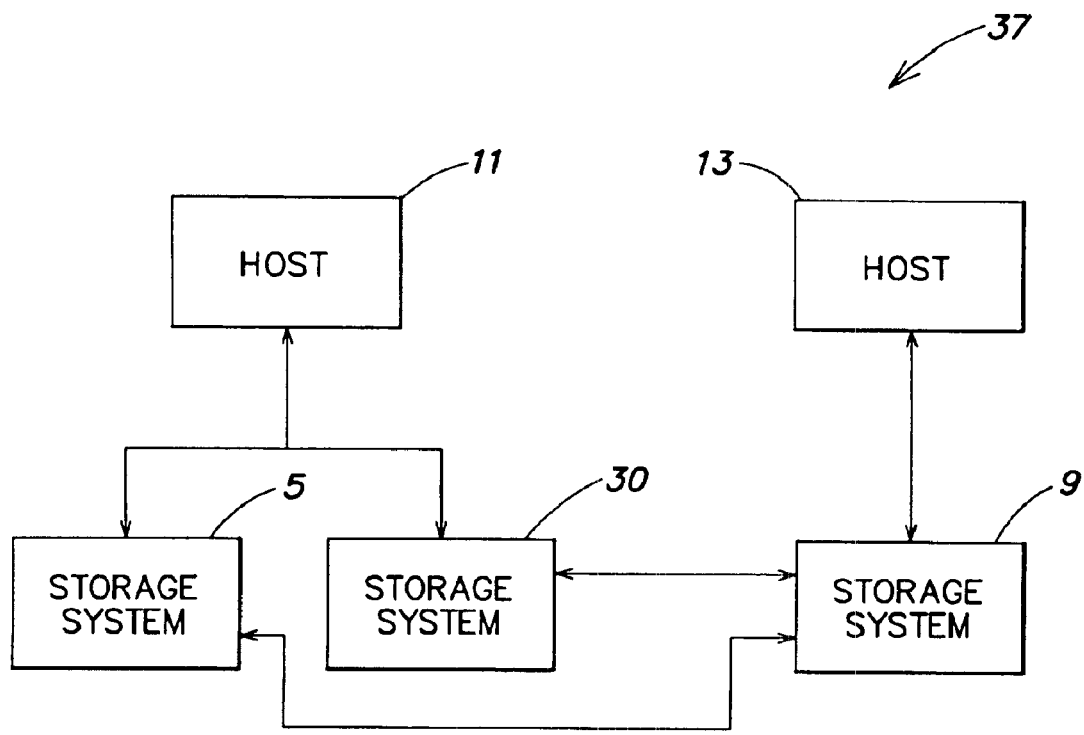
FIG. 4 is a block diagram of an illustrative computer system on which storage virtualization can be implemented in accordance with the embodiments of the present invention described herein.

An illustrative computer system 37 on which the data image 31 can be implemented is shown in FIG. 4, and is similar in many respects to the computer system shown conceptually in FIG. 1. The computer system 37 includes a pair of hosts 11, 13 and three storage systems 5, 30 and 9. As shown in FIG. 4, the host 11 is directly coupled to the storage systems 5 and 30, whereas the host 13 is directly coupled to the storage system 9. In addition, the storage system 9 is directly coupled to each of the storage systems 5 and 30. This direct coupling of the storage systems can be accomplished in any of numerous ways. For example, when the storage systems are implemented from the SYMMETRIX line of storage systems, a SYMMETRIX facility entitled SYMMETRIX remote data facility (SRDF) can be employed to facilitate communication between the storage systems. However, it should be appreciated that the present invention is not limited in this respect, and that the storage systems can be of any type, and can be interconnected in any way (e.g., via a network).

In the illustrative embodiment of FIG. 3, the data image 35 is stored on a single disk (identified as DISK5) on storage system 9, whereas the data image 33 is striped across two disks, including a disk (identified as DISK3) on storage system 5 and a disk (DISK6) on storage system 30.

It should be appreciated that the particular structure of the data object 31 illustrated in FIG. 3 is provided merely for illustrative purposes, and that numerous other structures are possible, including structures that include significantly more data images, and/or significantly more complex arrangements of the manner in which data images are stored across physical storage devices. Similarly, it should be appreciated that the illustrative computer system 37 shown in FIG. 4 is provided merely for illustrative purposes, and that numerous other computer system configurations are possible, including more complicated systems including greater numbers of hosts and storage systems, interconnected in any of numerous ways.

In accordance with one embodiment of the present invention, the data object 31 itself is considered to carry with it the definition of its internal structure. This structure can be defined by a set of classes, policies and rules that define the number of data images, how they interrelate and the manner in which each data image is implemented across physical storage devices. As stated above, each data image 33, 35 may be a complete copy of the data included in the data object. The policies or rules of the data object 31 define whether the data images are mirrored images or versions, and include the requirements for synchronization between the data images. There are no limitations on the type of information that can be provided in the rules and policies, as numerous options are possible. For example, the rules or policies for a data object 31 can impose geographical constraints concerning where specific data images should be physically stored (e.g., in connection with a large international network wherein it may be desirable to have particular data images stored in different cities). The rules or policies also can specify security access information concerning which hosts can access the data object, and can further limit access for particular hosts to only certain of the data images.

As discussed in more detail below, in accordance with one embodiment of the present invention, the computer system 37 includes a control station (not shown) that enables a system administrator to define the rules and policies for each of the data objects. After the high level structure of the data object is defined (e.g., the number of data images, any geographical constraints, mirror and versioning information, etc.), the capabilities of the physical storage devices can be considered in implementing the various data images that define the data object. In this respect, it should be appreciated that the data object can be implemented across numerous types of storage systems, including storage systems of different types and having differing capabilities. When implemented on a computer system including intelligent storage systems having sophisticated data management capabilities, those capabilities can be employed in implementing the necessary structure of the data object 31. This can be accomplished by a system administrator, or, in accordance with one embodiment of the present invention, can be accomplished automatically through the use of software that analyzes the components of the storage systems within the computer system and determines a specific physical layout for the data images that define the data object. Thereafter, in accordance with one embodiment of the present invention, metadata is created to define the data object 31.

It should be appreciated that the particular structure that implements a data object is transparent to the hosts that access the data object, such that each of the hosts simply uses the unique name assigned to a data object to access it, as the numbers of data images, their interrelationship and the physical storage devices that implement them all are transparent to the host.

Distributed Control

It should be appreciated that one aspect of the present invention that differs from conventional types of storage management is the distributed nature of the data object management. For example, although LVMs exist that manage the particular layout of logical volumes controlled thereby in a somewhat analogous fashion, that is accomplished through the use of a centralized controller, i.e., the LVM. Conversely, in accordance with one embodiment of the present invention, control over the data object is distributed throughout the computer system, as will be appreciated more fully from the discussions of illustrative embodiments below. For example, when a host seeks to access a particular data object, the host need not submit a request to a centralized controller that examines the request and determines the particular physical storage components needed to respond. Rather, the metadata that defines the data object is distributed throughout the computer system, such that the host gains access to at least some of the storage components that implement the data object automatically, without the need to access a centralized controller.

Uniquely Identifying Data Objects

As mentioned above, in accordance with one embodiment of the present invention, a unique ID is provided for each data object, so that each can be uniquely identified within a computer system. This can be done in any of numerous ways, as the present invention is not limited to any particular implementation technique. In accordance with one embodiment of the present invention, a unique ID can be provided to each data object, at the time of its creation, by a naming service. In one embodiment of the invention, the unique ID includes 128 bits, but it should be appreciated that unique identifiers of other sizes can be employed. The naming service can be implemented in any of numerous ways, and can be implemented similarly to naming services used in networking applications. The naming service assigns a unique ID to each data object at the time of its creation, and resolves any conflicts. Thereafter, the unique ID includes a pointer to the metadata for the data object, so that when a host seeks to access the data object by providing the appropriate unique ID, the metadata for the data object is returned to the host.

Load Balancing Among Data Images

Figure 5:
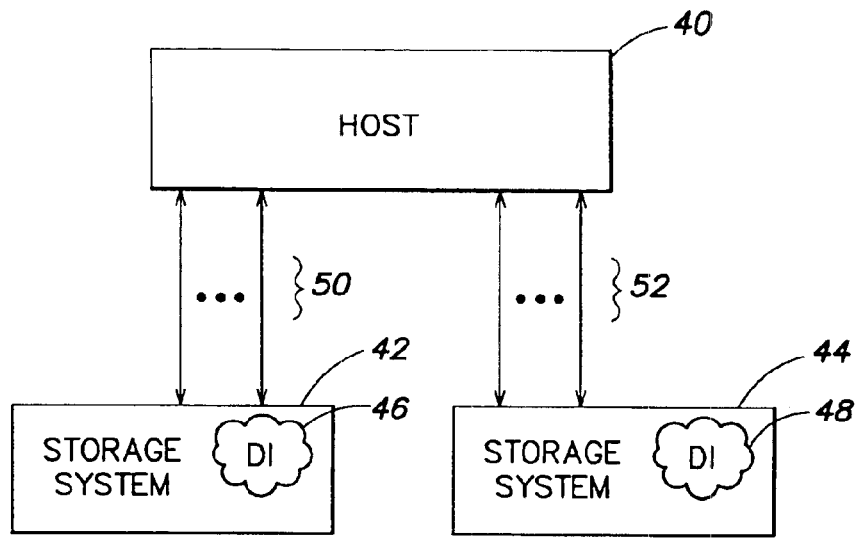
FIG. 5 is a block diagram illustrating the use of data objects in a multi-path computing system.

It should be appreciated that in many instances, a data object will include multiple data images that may be accessible to a host. This is illustrated in FIG. 5, where a host 40 is coupled to a pair of storage systems 42, 44, each of which includes a data image for the same data object. In particular, a data image 46 is stored on storage system 42, and a data image 48 is stored on storage system 44, with the data images 46, 48 corresponding to the same data object. Therefore, when the host seeks to access the data object, it can do so by accessing either the data image 46 or the data image 48. Thus, in accordance with one embodiment of the present invention, the host can be provided with the capability of selecting between multiple data images available to it, and can perform a load balancing selection process to optimize performance.

As mentioned above, in one embodiment of the present invention, the host includes one or more layers of conversion software that presents a data object to the application layer 15 (FIG. 2) as either a disk 19, file 25 or logical volume 21. Inside that layer(s) of software is an operation that performs a read of the metadata for a data object when access is attempted to the unique identifier for that data object. In response, the metadata for the data object is returned, and essentially includes information that explains the structure of the data object as illustrated conceptually in FIG. 3. As discussed below, in one embodiment of the present invention, the entire metadata for the data object is returned, while in another embodiment of the present invention, only the portions of the metadata that define data images that are physically accessible to the host are provided.

As explained above, once a particular data image is selected, the software layer within the host that examines the data learns the particular physical storage devices used to implement the data image, and issues an access request to those storage devices in the conventional manner. It should be appreciated that many computer systems employ multiple paths between a host and a storage system. This is illustrated in FIG. 5, wherein multiple paths 50 are provided between the host 40 and storage system 42, and multiple paths 52 are provided between the host 40 and the storage system 44. As discussed in co-pending application Ser. No. 09/233,998, entitled "METHOD AND APPARATUS FOR BALANCING WORKLOADS AMONG PATHS IN A MULTI-PATH COMPUTER-SYSTEM," multi-path computer systems can employ load balancing techniques over the multiple physical paths to improve system performance. When embodiments of the present invention are implemented on such a system, once the metadata for a data object is examined to identify the particular storage device on which a data image is stored, the access request to that storage device (e.g., a disk on a storage system) can be processed in the conventional way, which may include passing through load balancing software at the physical level to determine which of multiple paths to be used to implement the access. In accordance with one embodiment of the present invention, an additional layer of load balancing is performed at a higher level, specifically relating to a selection of which data image to access.

Returning to the example of FIG. 5, when the host 40 seeks to access the data object that includes data images 46, 48, it can do so by accessing either of those data images. Thus, in accordance with one embodiment of the present invention, the software layer that examines the metadata for the data object upon a host access can perform a selection process to select one of the available data images 46, 48 for access. This selection process can be accomplished in any of numerous ways, as this embodiment of the present invention is not limited to any particular technique. However, in accordance with one embodiment of the present invention, load balancing techniques can be employed to maximize performance of the system. While examples of particular load balancing techniques are recited in the above-referenced application, it should be appreciated that the present invention is not limited to employing any particular load balancing techniques. Furthermore, it should be appreciated that this embodiment of the present invention can be employed on computer systems that do not employ multiple paths between a host and a storage system, such that load balancing techniques can be employed in selecting which data image to access, but not thereafter in implementing the access to the particular physical storage locations. Alternatively, when employed on a multi-path system as shown in FIG. 5, this aspect of the present invention can employ two levels of load balancing, with a first relating to which data image to access, and a second relating to the manner in which the physical storage locations that implement that data image are accessed.

Asset and Attribute Allocation

As mentioned above, in one embodiment of the present invention, a tool (referred to as an allocation engine) is provided to facilitate the assignment of storage assets to physically store the data images specified when a data object is created. The physical storage resources within a computer system can be considered to constitute one or more pools of storage, wherein each pool shares common performance and/or functional characteristics (e.g., speed, size, reliability, type of storage device, functional capabilities, etc.). During the allocation process, each of the data images can be assigned to one or more pools of storage based upon the policies and rules that apply for that data image.

The types of attributes that can be defined for the data images in a data object are numerous, as the present invention is not limited to the use of any particular attributes. Examples of attributes that may apply to a data object or some of its data images include: (1) speed; (2) reliability, (3) size, (4) remote mirroring, (5) local mirroring; (6) performance attributes such as write once or write mostly; (7) disaster recovery; (8) versioning; and (9) application-specific attributes such as (a) a database log; (b) a temporary file; (c) mail systems; (d) web browser, etc. Thus, as seen from the foregoing illustrative list, attributes can be assigned for a particular host, or a specific application within the host.

Thus, when a data object is created and its attributes are defined, in one embodiment of the present invention the allocation engine will look to the attributes and the pool of available storage resources, and make intelligent decisions concerning which storage resources should be used to implement each of the data images for the data object As mentioned above, the attributes/rules can also define the synchronization requirements for mirrors, which can impact the physical layout of mirrored devices.

As should be seen from the foregoing, the attributes can relate to any particular capabilities of the storage systems available within the computer system, an example of which is hardware replication techniques that can be used to present multiple images. When the storage systems are selected from the SYMMETRIX line of disk arrays, any of the special functionality provided thereby can be employed in implementing the attributes of the data object, e.g., a local mirroring operation can be implemented using hardware mirroring capabilities such as a business continuance volume (BCV) and a remote mirror can be implemented using SRDF. In addition, security capabilities provided within the storage system can be used to limit the visibility of certain data images only to hosts having the appropriate access privileges, an illustrative implementation of which is described in PCT publication WO 00/00889, entitled Method and Apparatus For Providing Data Management For a Storage System Coupled To a Network. Of course, it should be appreciated that the embodiment of the present invention related to utilizing the capabilities of the storage system to implement functional aspects of the data object is not limited to use with storage systems from the SYMMETRIX line of disks arrays, and can be used with any storage system, including those that capabilities similar to those described above or different capabilities.

While hierarchical storage asset management has been done before, two aspects of the allocation engine in accordance with one embodiment of the present invention are believed to be unique. First, storage asset management is conventionally done manually by a system administrator, as opposed to being done automatically by an allocation engine. Second, conventional storage system management is typically done on a single storage system and/or a single host. Conversely, in accordance with one embodiment of the present invention, the allocation engine allocates resources across an entire network of storage devices (e.g., an SAN).

It should be appreciated that the particular methodology or algorithm employed by the allocation engine to implement the assignment of storage assets to physically store the data images of a data object can take any of numerous forms, as the present invention is not limited to any particular implementation technique. In accordance with one embodiment of the present invention, a first best fit algorithm can be employed, to search from the lists of potential candidates and select the first that meets the specified criteria. However, numerous other techniques alternatively can be employed.

It should be appreciated that in accordance with one embodiment of the present invention, a central resource (referred to as a control station below) is provided to enable a user to define or modify the configuration of a data object. However, it should be appreciated that when a central control station is employed for this purpose, it does not diminish the fact that control over access to a data object is distributed, as the control station need not be accessed by a device seeking access to a data object, as access requests can be directed to numerous places distributed throughout the system as discussed in more detail below.

Data Object Building Blocks

Figure 6:
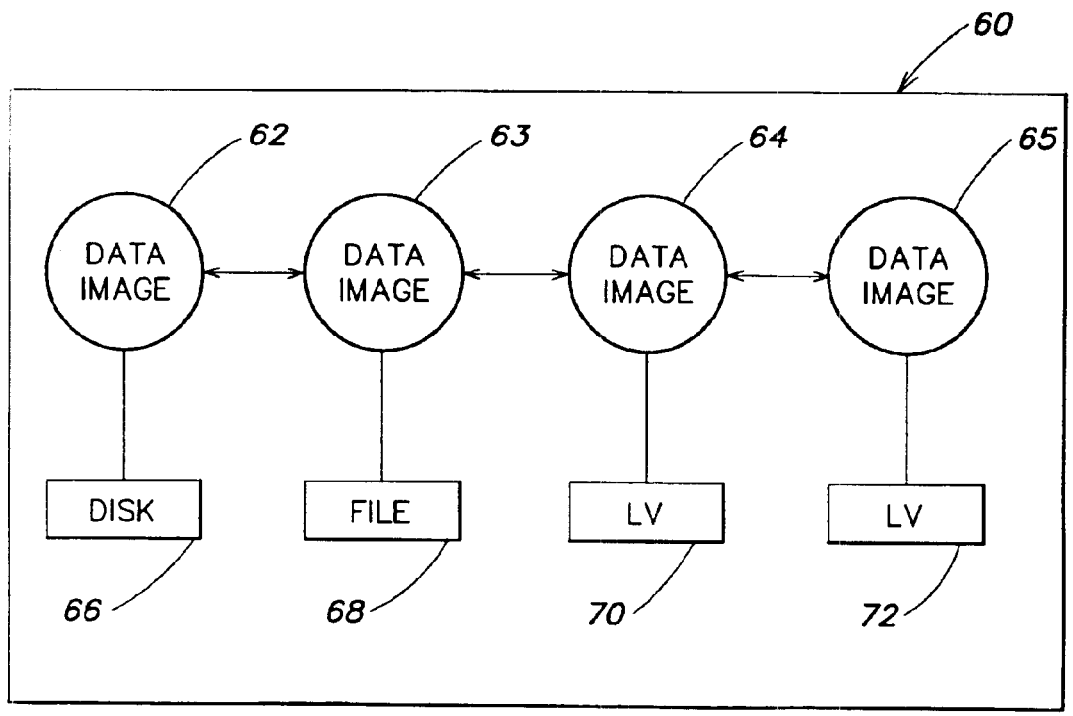
FIG. 6 conceptually illustrates a data object formed using disks, files and logical volumes in accordance with one embodiment of the present invention.

In one embodiment of the present invention, the storage assets that can be employed as the building blocks for a data object are not limited to disks provided from a storage system. In this respect, in accordance with one embodiment of the present invention, the building blocks that form a data object can also include files 25 (FIG. 2) from a file system, and/or logical volumes 21 (FIG. 2) from a logical volume manager. This is shown conceptually in FIG. 6, wherein a data object 60 includes four data images 62–65. The data images 62–65 are implemented using different types of storage resources. Specifically, data image 62 is implemented via a disk 66 exported from a storage system, data image 63 is implemented via a file 68 output from a file system, data image 64 is implemented via a logical volume 70 output from an LVM on a first host, and data image 65 is implemented via a logical volume 72 output from an LVM on a different host. It should be appreciated that the data object shown in FIG. 6 is provided merely for illustrative purposes, and that numerous other structures are possible. For example, while a simple structure is shown wherein each data object is implemented by a single storage resource, it should be appreciated from the foregoing description that this is not a restriction of the present invention, as each data image can be implemented via two or more storage resources, including storage resources of different types (e.g., across a disk, file and logical volume).

The use of storage components other than a disk as the building blocks for a data object provides a number of powerful capabilities. For example, many installed systems employ logical volume managers to manage storage, and administrators of such systems typically are hesitant to move away from the LVMs. However, one downside of employing LVMs is that they often do not have certain powerful management functionality that is available by managing storage at the disk level, for example using intelligent storage systems such as those from the SYMMETRIX line of storage systems. Thus, in accordance with one embodiment of the present invention, a data object can be formed with a first data image implemented on a logical volume, and a second data image on a disk, for example from a SYMMETRIX storage system. As a result, the logical volume can be "migrated" to a disk, which enables an installed base to continue to use its existing LVM, while also leveraging the functional capabilities that the storage system provides for its disks. For example, if remote mirroring is desired for a logical volume output from an LVM, a data object can be provided that includes one data image assigned to the logical volume, and another that is assigned to a disk output from a SYMMETRIX storage system, and then the SRDF capability of the SYMMETRIX storage system can be employed to conveniently and efficiently implement the remote mirror. Of course, it should be appreciated that this is simply an example, and that numerous other advantages can be achieved by migrating a logical volume to a storage system disk.

Another powerful capability of the embodiment of the present invention shown in FIG. 6 is to allow LVMs on two different hosts to communicate. Conventionally, LVMs on different hosts each is visible only within its own host, such that the LVMs cannot communicate and work effectively together to manage the overall system. In accordance with the embodiment of the invention shown in FIG. 6, logical volumes 70, 72 from LVMs on different hosts each can be assigned to a same data image. As a result, each host is able to access logical volumes managed by an LVM on another host, which can be useful for any number of reasons.

Distributed Metadata Store

As mentioned above, one embodiment of the present invention is directed to decentralized control, wherein a data object is considered to carry with it its own control information. In one embodiment of the present invention, this is implemented via the use of a distributed metadata store, wherein the metadata defining a data object is distributed throughout the computer system. This embodiment of the invention will be described referring to a computer system 79 illustrated in FIG. 7. The computer system 79 is similar in many respects to the computer system 37 of FIG. 4, but is one wherein the components of the system are interconnected via a storage area network (SAN) 80. In addition, the computer system 79 includes a control station 82 to perform certain control functions relating to the creation of a data object. The control station can be implemented in any of numerous ways. For example, the control station can be implemented on a stand-alone server, on one of the hosts 11, 13, or on any computer within the computer system 79.

The control station 82 has a user interface (not shown) that enables a system administrator to specify to the control station 82 the structure desired for a data object being created. Examples of the numerous ways in which a data object can be defined were described above. In one embodiment, the control station 82 executes software to perform the functions of the allocation engine discussed above, by examining the storage resources available within the computer 79 and applying the rules and policies to construct the data object. As part of the process of constructing the data object, the control station 82 can create the metadata that describes it. In accordance with one embodiment of the present invention, the control station 82 includes a full metadata store (FMDS) 84 for each data object created.

It should be appreciated from the description above that each host within the computer system 79 that can access a data object preferably has access to at least the portions of the metadata of the data object that define the data images accessible to that host. In accordance with one embodiment of the present invention, the control station 82 ensures that the metadata for each data object is accessible to every host. In the embodiment shown in FIG. 7, each of the hosts has access, over the SAN 80, to the control station 82, and thereby can have access to the full metadata store 84.

Figure 7:
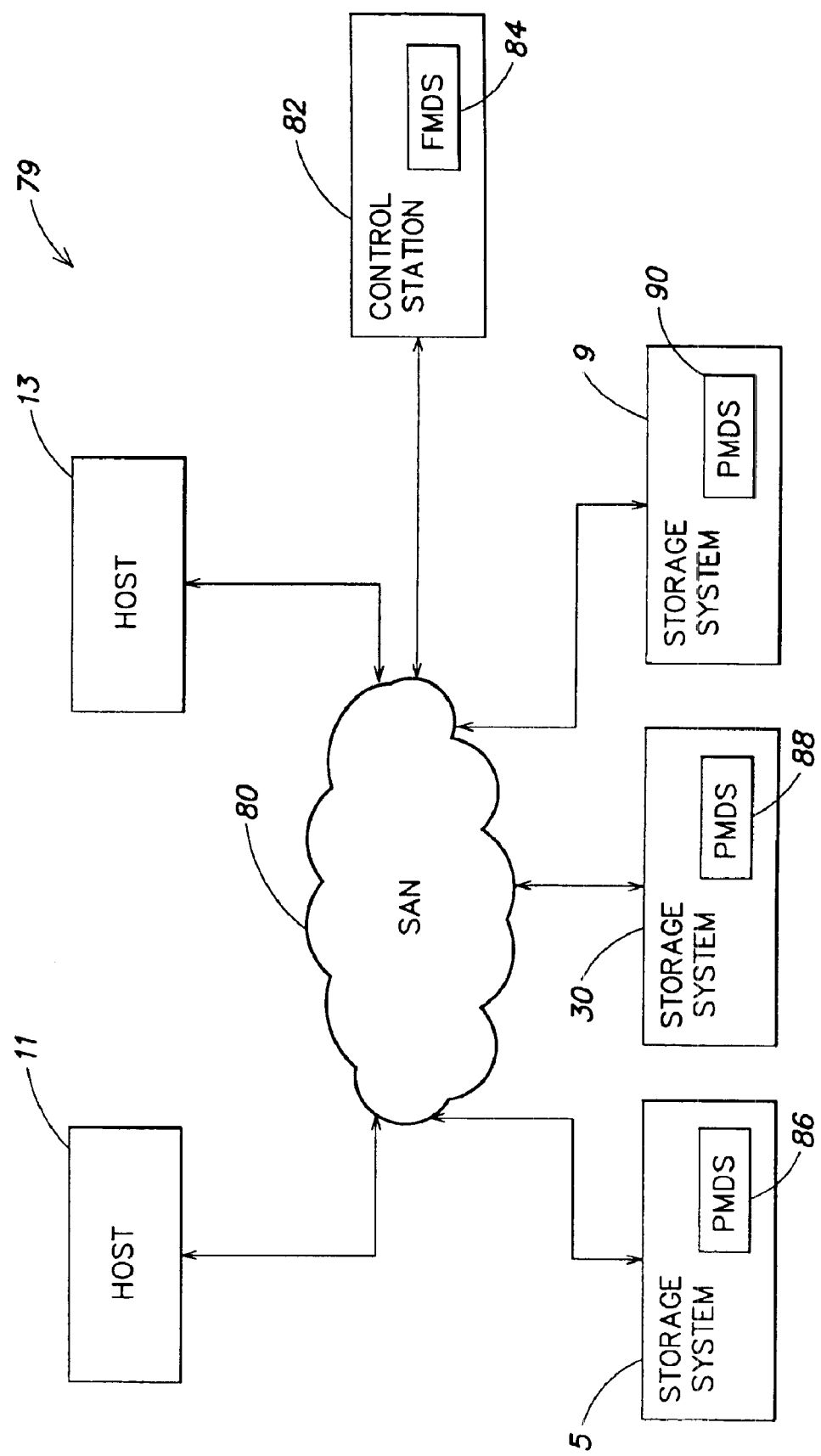
FIG. 7 is a block diagram of an illustrative computer system including a distributed metadata store in accordance with one embodiment of the present invention.

In accordance with one embodiment of the present invention shown in FIG. 7, in addition to the full metadata store 84 maintained in the control station 82 for each data object, partial metadata stores are distributed throughout the computer system 79. In particular, each of the storage systems 5, 30 and 9 includes a partial metadata store, respectively labeled as 86, 88 and 90. Specifically, each of the storage systems includes a partial metadata store for any data object that is constructed using resources from that storage system, and the partial metadata store is sufficient to identify any data image that is formed using resources from the storage system, as well as data images that are dependent on them.

For example, referring to FIG. 7, the storage system 9 includes a partial metadata store 90 which defines only the data image 35 (FIG. 3) of the data object 31, and does not include the metadata for data object 31 that relates to data image 33, as no portion of data image 33 is stored on storage system 9, and the data image 33 is not dependent on the data image 35. Conversely, the storage systems 5 and 30 include partial metadata stores 86 and 88 which define not only the data image 33 (FIG. 3), but also that define the mirrored data image 35, because the data image 35 is dependent upon data image 33. In this respect, the data image 35 is described as being "dependent" on the data image 33 because updates to the data image 33 are transmitted by the data object to the data image 35 to effectuate the mirrored relationship. Conversely, as mentioned above, the data image 33 is not considered to be dependent upon data image 35, because updates to the data image 35 need not be propagated by the data object to the data image 33. The partial metadata stores 86 and 88 on storage systems 5 and 30 may only identify the existence of the data image 35, and need not include the specific information relating to the physical storage devices on which it is stored.

It should be appreciated that the above-described technique for implementing partial metadata stores is provided solely for illustrative purposes, and that numerous other techniques are possible.

It should be appreciated that the embodiment of the present invention relating to a distributed metadata store is not limited to providing only partial metadata stores on the storage systems that include components of a data object, as each of these could alternatively include a complete copy of the full metadata store 84. However, the embodiment of the present invention that employs partial metadata stores is advantageous, in that it uses less storage resources. In addition, it should be appreciated that a full metadata store is not necessary in each storage system, as the storage systems ultimately pass this metadata to the host (as discussed below), and each host need not have metadata relating to any data object images that the host does not have access to (e.g., either physical access via an available communication path or access privileges).

It should be appreciated that providing a distributed metadata store, rather than having all hosts access a centralized metadata store (e.g., in the control station 82), is advantageous for two reasons. First, the system is more fault tolerant, as there is no single point of failure (e.g., if the link to the control station 82 were to be lost). Second, contention for access to the control station 82 via all of the hosts can be avoided, as each host can gain access to the relevant portions of the metadata from other locations.

In the embodiment of the invention shown in FIG. 7, the control station 82 maintains a full metadata store 84 even after all the information included therein is distributed among the storage systems 6, 9 and 30. This is advantageous, in that it provides for redundancy and maintains a single collection of all of the metadata information for each data object. However, it should be appreciated that this is not a requirement, and that in other embodiments the control station need not maintain the full metadata store 84 after it has been distributed among other components in the system.

In the embodiment of the invention shown in FIG. 7, each of hosts 11, 13 has access, over the SAN 80, to each of the storage systems 5, 9 and 30. However, it should be appreciated that in other configurations, this may not be the case, as each host may have access only to a subset of the storage systems.

As mentioned above, a host accesses a data object by seeking access to the unique identifier assigned to that data object, and in response, the metadata for that data object is returned to the host. This can be accomplished in any of numerous ways, as the present invention is not limited to any particular implementation technique. In accordance with one embodiment of the present invention, each time a host is booted, it queries each of the storage systems accessible to it, to collect the metadata for the data objects accessible to the host. In an alternate embodiment of the invention, this process is not performed at boot time, to minimize boot time for the host. Rather, the collection of the metadata for a data object is initiated when the host device first does an "open" I/O for the data object. The host then receives the relevant portions of the metadata from the storage systems accessible to it, and maintains a local copy (e.g., within the host) of the metadata so that it need not collect the metadata each time it attempts to access the data object. Thereafter, each time the host seeks to access the data object, it refers to its local copy of the metadata.

As mentioned above, the embodiment of the present invention that maintains a local copy of the metadata for each data object accessible to a host is advantageous, in that the host need not collect the metadata each time it seeks to access a data object. However, it should be appreciated that the present invention is not limited in this respect, and that the host need not maintain a local copy.

As should be appreciated from the foregoing, one embodiment of the present invention employs multiple copies of metadata for a data object, including a full metadata store 84 in control station 82, partial metadata stores in the storage systems, and local copies in the hosts. In accordance with one embodiment of the present invention, a technique is employed to maintain coherency among the multiple copies of the metadata for each data object. This can be accomplished in any of numerous ways, as the present invention is not limited to any particular implementation technique.

In accordance with one embodiment of the present invention, consistency of the multiple copies of the metadata is maintained in the following manner. Initially, a restriction is imposed, whereby the control station 82 is the only component in the system 79 that can initiate a change in the metadata for any data object in the system. Thus, the control station 82 can detect any changes to the metadata for a storage object. In accordance with one embodiment of the present invention, control station 82 is responsible for updating the appropriate storage systems that have partial copies of the metadata for a data object when the full metadata store for that data object is updated, and each storage system is then responsible for propagating that change information to any of the hosts that have accessed the metadata from that storage system. This can be accomplished in any of numerous ways. In accordance with one embodiment of the present invention, each time a host attempts to open a data object for which a storage system has metadata, that storage system updates a list, such that the storage system maintains a list of all hosts that have accessed the metadata for a particular data object. Thus, when a storage system receives an update from the control station 82 indicating that metadata for a data object has been updated, the storage system knows which hosts have previously accessed the outdated metadata, and can propagate the updated metadata to those hosts. Thus, it is the storage systems in this embodiment of the present invention that update hosts when the metadata for a data object has been modified, which is reversed from the manner in which things are done conventionally in host-centric systems, wherein a host controls the storage units stored on a storage system, and is the entity that initiates a change in metadata and propagates any changes to the storage system.

In accordance with one illustrative embodiment of the present invention, each copy of the metadata for a data object (whether it be a partial metadata store or a full metadata store) can include information to reflect when it was last updated. This information can enable a host having access to multiple copies of the metadata for a data object to determine which copy has the most up to date information.

Illustrative Implementation of Control Station

It should be appreciated that the above-described functions of the control station can be implemented in any of numerous ways, as the present invention is not limited to any particular implementation. In accordance with one embodiment of the present invention, the control station is implemented on a single server that performs all of the functions of the control station. However, it should be appreciated that alternative implementations are possible, including ones wherein the functions of the control station are distributed among multiple servers.

Figure 8:
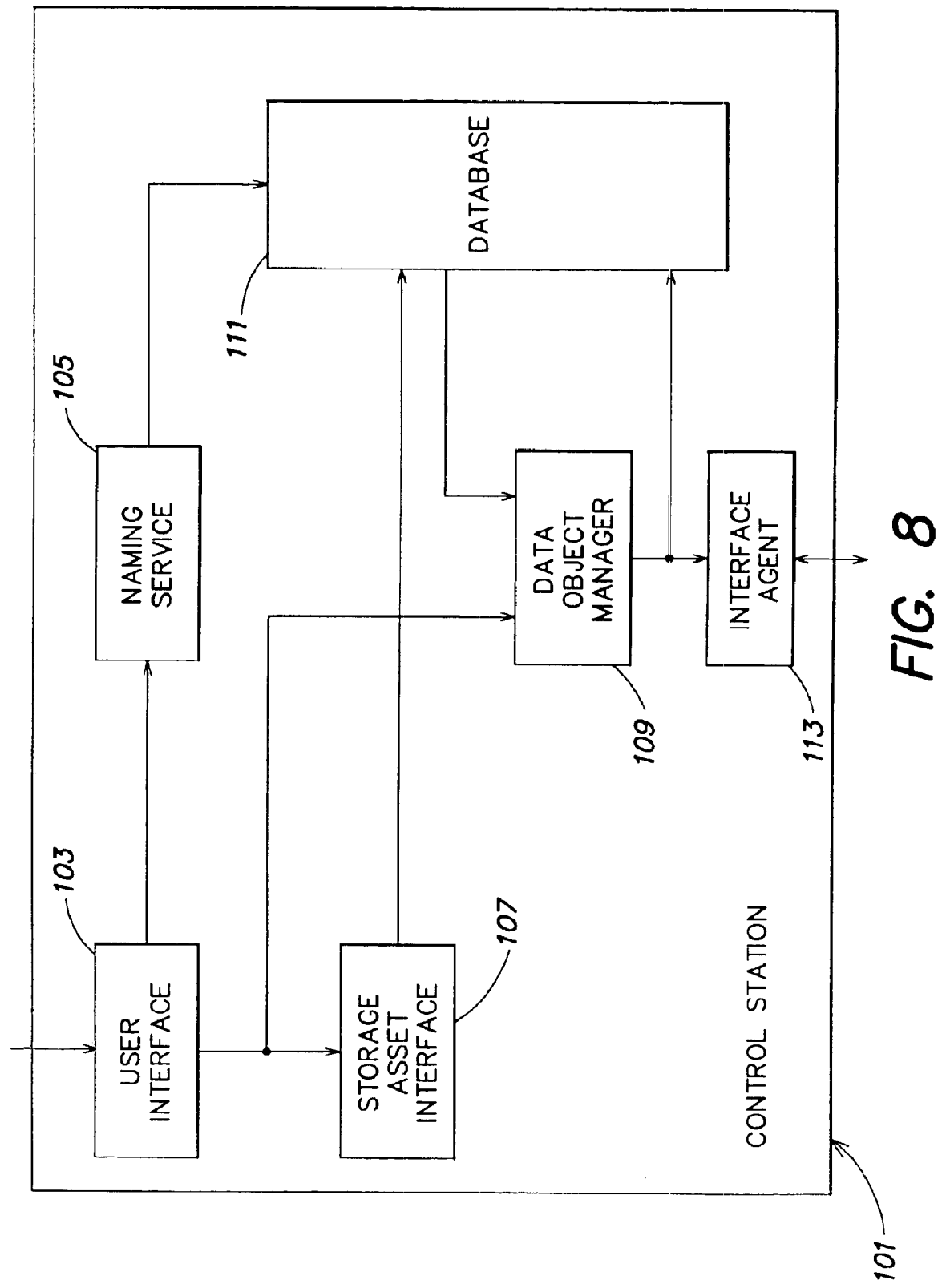
FIG. 8 is a block diagram of an illustrative implementation of a control station in accordance with one embodiment of the present invention.

An illustrative implementation of a control station 101 is shown in FIG. 8. Again, it should be appreciated that this is provided merely for illustrative purposes, as the present invention is not limited to this or any other particular implementation.

The control station 101 includes a user interface 103 that enables a system administrator or other user to communicate with the control station to perform any of the types of communication discussed below, e.g., to allow for defining or reconfiguring one or more data objects. In accordance with one embodiment of the present invention, the user interface 103 cooperates with one or more host computers, such that the control station 101 does not itself include a data entry device, but rather, can receive information from a data entry device on a host computer. Of course, it should be appreciated that the user interface can be implemented in any of numerous ways, including through the use of a data input/output device directly coupled to the control station 101, rather than being coupled through one or more host computers.

The control station 101 also includes a naming service 105 that performs the functions described above to provide a unique identifier to each data object created via the control station, and to translate user attempts to access a data object into the appropriate metadata for the data object.

In the embodiment of FIG. 8, the control station 101 further includes a storage asset interface 107 and a data object manager 109 that essentially perform the functions of the allocation engine discussed above. In accordance with one embodiment of the present invention, the storage asset interface 107 determines what physical storage resources are available, and groups these resources into pools to facilitate their allocation by the data object manager 109. The pools can be organized in any of numerous ways, such as via the attributes and capabilities of the pooled resources. The information relating to the available storage resources can be manually input by a system administrator, via the user interface 103, or can be obtained by the control station 101 interrogating the storage devices available on the computer system.

Control station 101 further includes a database 111 that stores numerous types of information used by the other components within the control station 101. For example, the database 111 can store information relating to which storage resources are available for allocation by the data object manager 109, and which already have been allocated to particular data objects. In addition, the database 111 can include the full metadata store for each data object created by the data object manager 109.

In accordance with one embodiment of the present invention, in addition to the pooling together of storage resources having common attributes or capabilities, other grouping utilities can be employed to facilitate the creation of a data object. For example, in accordance with one embodiment of the present invention, the database 111 stores predefined classes of data objects, with each class providing a general description or topology for a particular type of data object that may be frequently employed. Thus, when a system administrator desires to create a new data object, the system administrator can easily select from one of the predefined classes that may be suitable. Alternatively, the system administrator can custom build a different type of data object that is distinct from the predefined classes. Although the use of predefined classes is advantageous, it should be appreciated that the present invention is not limited in this respect, and that predefined classes of data objects need not be employed.

Another organizational technique that can be optionally employed in accordance with one embodiment of the present invention relates to the formation of groups of data objects. A group is a list of data objects, and can provide a convenient management resource for a system administrator, who can perform one or more administrative functions on all of the data objects within a group. Again, it should be appreciated that although advantageous, groupings of data objects need not be employed in all embodiments of the present invention.

As discussed above, in the illustrative implementation shown in FIG. 8, the data object manager 109, working with the storage resources provided by the storage asset interface 107, performs the above-described functions of the allocation engine to create the metadata for data objects, and then stores that metadata in the database 111. In addition, when classes, pools and groups are employed, these also can be stored in the database 111, and can be managed by the data object manager 109.

Figure 9:
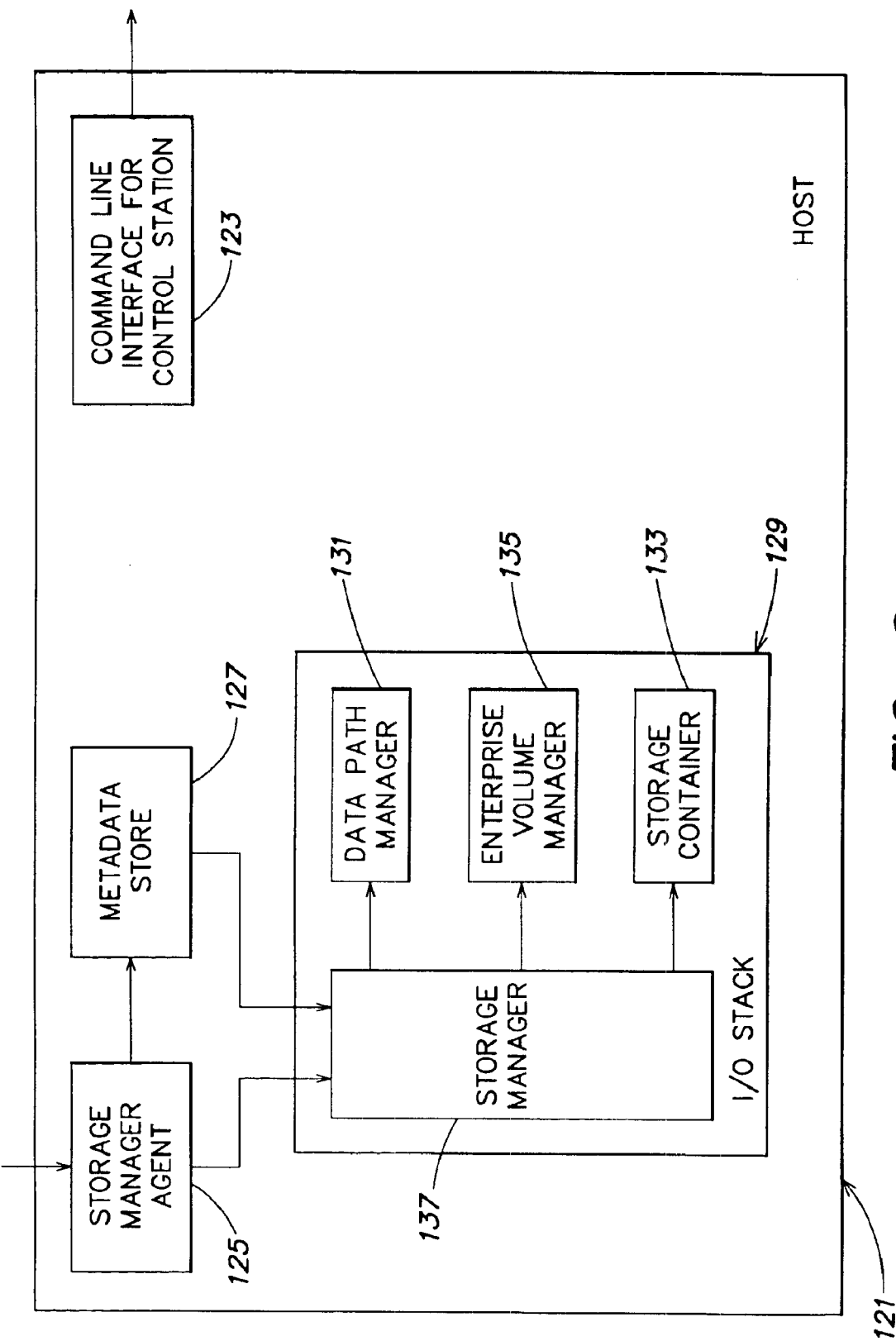
FIG. 9 is a block diagram of an illustrative implementation of components to be added to a host to implement storage virtualization in accordance with one embodiment of the present invention.

Finally, the illustrative implementation of the control station 101 further includes an interface agent 113 that can communicate with counterpart agents in each of the host computers and storage systems. Examples of the types of communication that can be controlled by the host interface agent 113 include information relating to the propagation of a change in the metadata for a data object. For example, if a host is currently using a data object and the metadata for that data object is changed via the control station 101, the interface agent 113 can communicate with the host to have it suspend access to the data object while the control station 101 implements the desired changed to the metadata. In addition, the interface agent 113 can control communication with corresponding agents in the storage systems to perform necessary updates to the metadata for a data object Illustrative Host Implementation An illustrative implementation of the components to be added to a host to enable storage virtualization in accordance with the embodiments of the present invention described herein is shown in FIG. 9. It should be appreciated that this implementation is provided merely for illustrative purposes, as the present invention is not limited to this or any other particular implementation, as the capabilities of the host to enable storage virtualization in accordance with the various embodiments of the present invention described herein can be implemented in any of numerous ways.

In the illustrative implementation shown in FIG. 9, the host 121 includes a command line interface 123 for interfacing with the control station. As discussed above, this enables a user interface (not shown) on the host 121 to be used by a system administrator as a data input/output device for the control station 101. However, as also mentioned above, in an alternate embodiment of the present invention, the host need not be provided with such a command line interface 123, as a user interface can be provided directly on the control station 101.

The host 121 further includes a storage manager agent 125 that communicates with the interface agent 113 on the control station 101, as well as with storage devices in the computer system, to pass information relating to the metadata of data objects accessible to the host 121.

As mentioned above, in one embodiment of the present invention, the host includes a metadata store 127 to store a local copy of the metadata for data objects accessible to the host 121. It should be appreciated that the local metadata store 127 is an optional feature, and is not a requirement of all embodiments of the present invention.

In the embodiment of the present invention shown in FIG. 9, the other functionality on the host 121 to implement storage virtualization can be implemented in the I/O stack 129 of the operating system. The I/O stack 129 can be provided with a data path manager 131, which acts as a presenter layer that presents the data objects to other layers in the I/O stack as a disk, logical volume and/or a file, in the manner discussed above. Similarly, the I/O stack 129 includes a storage container layer 133, which allows for the various storage resources that can be used to implement a data object (e.g., a disk, logical volume and/or file as discussed above) to be abstracted and presented to the layers above as a consistent unit of storage, so that the layers above need not be concerned with particular methods of communicating with these various storage resources.

In the implementation shown in FIG. 9, the I/O stack 129 further includes an enterprise volume manager layer 135 disposed between the data path manager 131 and the storage container 133. As should be appreciated from the foregoing, data objects can be comprised of numerous different storage resources, and may institute various data management functionality (e.g, mirroring, striping, spanning, slicing, etc.). It is the role of the enterprise volume manager 135 to manage this functionality. Thus, the enterprise volume manager 135 can convert read/write requests (received from the data path manager 131) directed to a data object, and can, when called for by the definition of the data object, turn each such I/O request into multiple I/O requests directed to multiple storage resources to implement the management functionality inherent in the data object.

Finally, in the implementation shown in FIG. 9, the I/O stack 129 includes a storage manager 137 that interacts with each of the data path manager 131, enterprise volume manager 135 and storage container 133 to provide them with the metadata for the data objects. As should be appreciated from the foregoing, the storage manager 137 can obtain the metadata for a data object either locally (e.g., from the metadata store 127), or can obtain it from another device in the computer system (e.g., the control station 101 or a storage device) via the storage manager agent 125.

Illustrative Storage System Implementation

Figure 10:
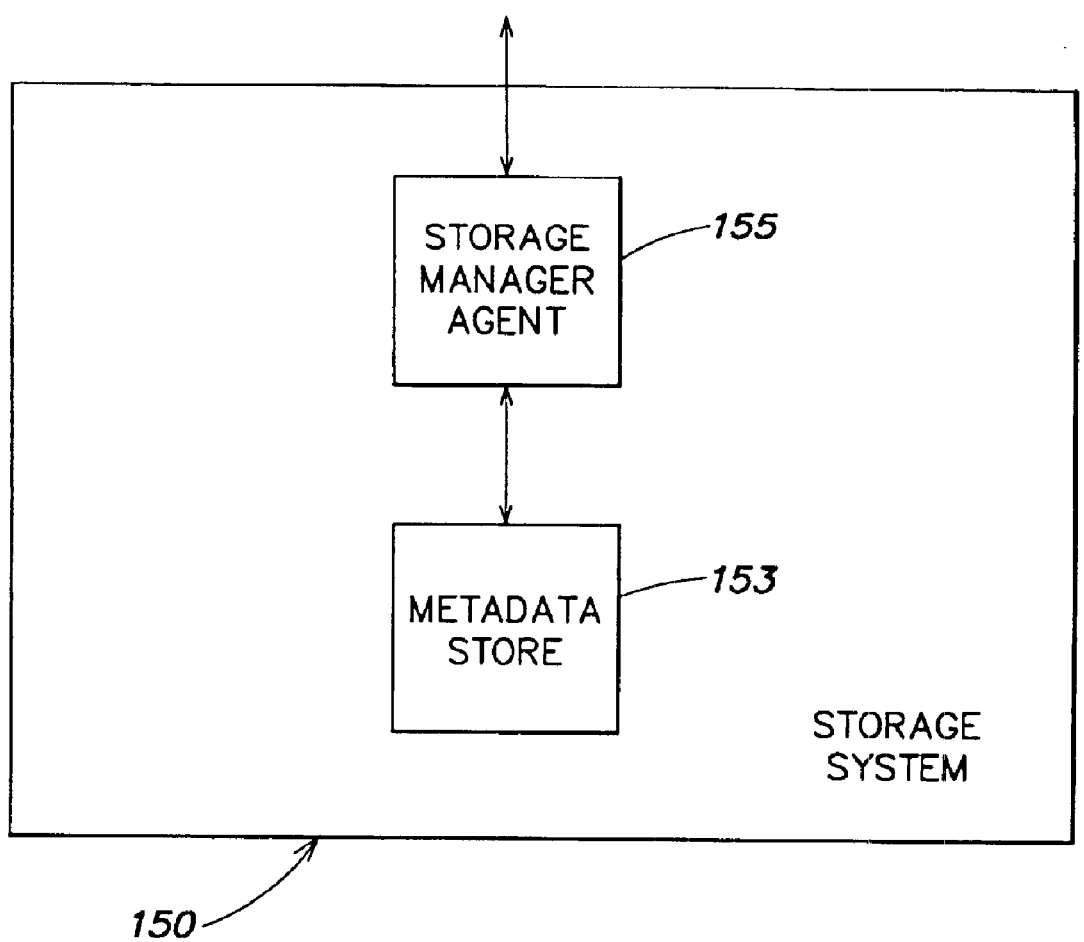
FIG. 10 is a block diagram of an illustrative implementation of components to be added to a storage system to implement storage virtualization in accordance with one embodiment of the present invention.

An illustrative implementation of the components to be added to a storage system to enable storage virtualization in accordance with the embodiments of the present invention described herein is shown in FIG. 10. It should be appreciated that this implementation is provided merely for illustrative purposes, as the present invention is not limited to this or any other particular implementation, as the capabilities of the storage system to enable storage virtualization in accordance with the various embodiments described herein can be implemented in any of numerous ways. For example, storage virtualization in accordance with some of the embodiments of the present invention can be implemented without requiring any modification whatsoever to standard storage systems.

In the illustrative implementation shown in FIG. 10, the storage system 150 includes a metadata store 153 to store a local copy of the metadata for data objects having at least a portion thereof stored on the storage system 150. As mentioned above, the metadata store 153 is an optional feature, and is not a requirement of all embodiments of the present invention.

In the implementation shown in FIG. 10, the storage system 150 further includes a storage manager agent 155 that communicates with the interface agent 113 on the control station 101, as well as with the storage manager agents 125 on the hosts, to pass information relating to the metadata of data objects supported on the storage system 150. This communication can take any of numerous forms. For example, in one embodiment of the present invention, the metadata for a data object is created on the control station 101, and then is distributed therefrom to the storage systems 150, which can then distribute local copies of some of the metadata to the hosts. In accordance with one embodiment of the present invention, the storage manager agent 155 on the storage system 150 can manage the transfer of the metadata from the control station 101 to the storage system 150, and further from the storage system 150 to the hosts.

In accordance with one embodiment of the present invention, the storage manager agent 155 can also act to prevent inadvertent access or modification of the metadata store 153, for example by ensuring that the metadata store 153 can only be modified via the control station 101.

The above-discussed embodiments of the present invention can be implemented in any of numerous ways. For example, each of the components that can be added to a host, the control station or the storage system can be implemented in hardware, software, or a combination thereof. When implemented in software, the routines can be executed on any suitable processor.

It should be appreciated that any single component or collection of multiple components of any element within a computer system (e.g., a host, the storage system or the control station) that performs the functions described above can be generically considered as one or more controllers that control the above-discussed functions. The one or more controllers can be implemented in numerous ways, such as with dedicated hardware, or using a processor that is programmed using microcode or software to perform the functions recited above. In this respect, it should be appreciated that one implementation of the present invention comprises at least one computer readable medium (e.g., a computer memory, a floppy disk, a compact disc, a tape, etc.) encoded with a computer program that, when executed on a processor, performs the above-discussed functions that implement the embodiments of the present invention described above. The computer readable medium can be transportable such that the programs stored thereon can be loaded onto any computer system resource to implement the aspects of the present invention discussed above. In addition, it should be appreciated that the reference to a computer program that, when executed, performs the above-discussed functions is not limited to an application program running in application space on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is provided by way of example only, and is not intended to be limiting. The invention is limited only as defined by the following claims and the equivalents thereto.

What is claimed is:

1. A method of managing a virtual data storage object in a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource and a file system that presents at least one file to other layers in the host as a storage resource, the method comprising acts of:

(A) creating the virtual data storage object to be independent of any particular host and any particular storage device;
   (B) creating the virtual data storage object so that at least one of the at least one logical volume and the at least one file is employed as a storage resource to store data stored to the virtual data storage object;
   (C) receiving a set of parameters that defines a plurality of data images for the virtual data storage object and a manner in which the plurality of data images are interrelated; and
   (D) automatically assigning the storage resources within the computer system to store each of the plurality of data images.

2. The method of claim 1, further including an act of:
   (E) providing the host with a software layer that presents the virtual data storage object to other layers in the host as a storage disk.

3. The method of claim 1, further including an act of:
   (E) providing the host with a software layer that presents the virtual data storage object to other layers in the host as a logical volume.

4. The method of claim 1, further including an act of:
   (E) providing the host with a software layer that presents the virtual data storage object to other layers in the host as a file.

5. The method of claim 1, further including acts of:
   (E) creating metadata defining the virtual data storage object; and
   (F) distributing the metadata about the computer system so that there is no central location that is the exclusive resource for accessing the metadata.

6. The method of claim 5, wherein the at least one storage device comprises a plurality of storage devices, and wherein the act (F) comprises an act of distributing the metadata among each of the plurality of storage devices that stores data stored to the virtual data storage object.

7. The method of claim 6, wherein the act (F) comprises an act of distributing only a subset of the metadata to at least one of the plurality of storage devices.

8. The method of claim 5, wherein the at least one host comprises a plurality of hosts, and wherein the act (F) comprises an act of distributing the metadata among each of the plurality of hosts that accesses the virtual data storage object.

9. The method of claim 8, wherein the act (F) comprises an act of distributing only a subset of the metadata to at least one of the plurality of hosts.

10. The method of claim 5, wherein the at least one storage device comprises a plurality of storage devices, wherein the at least one host comprises a plurality of hosts, wherein the act (E) comprises an act of creating the metadata on a control station, and wherein the act (F) comprises an act of transmitting the metadata from the control station to the plurality of storage devices, and from the plurality of storage devices to the plurality of hosts.

11. The method of claim 1, wherein the act (B) comprises an act of creating the virtual data storage object to comprise at least first and second data images, and wherein the method further comprises acts of presenting each of the first and second data images to one of the plurality of hosts and performing a selection process within the one of the plurality of hosts to select which of the first and second data images to employ in accessing the virtual data storage object.

12. The method of claim 1, wherein the act (B) comprises an act of creating the virtual data storage object so that the at least one logical volume is employed as a storage resource to store data stored to the virtual data storage object.

13. The method of claim 1, wherein the act (B) comprises an act of creating the virtual data storage object so that the at least one file is employed as a storage resource to store data stored to the virtual data storage object.

14. The method of claim 1, wherein the at least one host comprises first and second hosts, wherein the first host comprises a first LVM and the second host comprises a second LVM, wherein the act (B) comprises an act of creating the virtual data storage object to comprise at least first and second data images, with the first data image being stored on a logical volume presented by the first LVM and the second data image being stored on a logical volume presented by the second LVM.

15. The method of claim 1, wherein the at least one logical volume comprises a plurality of logical volumes, wherein the at least one storage disk comprises a plurality of storage disks, and wherein the act (B) comprises an act of creating the virtual data storage object to comprise at least first and second data images, with the first data image being stored on one of the plurality of logical volumes and the second data image being stored on one of the plurality of storage disks.

16. The method of claim 1, wherein the at least one storage device comprises a plurality of storage devices, and wherein the act (D) comprises an act of considering performance and functionality characteristics of the plurality of storage devices in making the automatic assignment.

17. A method of managing a virtual data storage object in a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource and a file system that presents at least one file to other layers in the host as a storage resource the method comprising acts of:

(A) creating the virtual data storage object to be independent of any particular host and any particular storage device;
   (B) creating the virtual data storage object so that at least one of the at least one logical volume and the at least one file is employed as a storage resource to store data stored to the virtual data storage object;
   (C) creating metadata defining the virtual data storage object; and
   (D) distributing the metadata about the computer system so that there is no central location that is the exclusive resource for accessing the metadata;
   wherein the at least one storage device comprises a plurality of storage devices, wherein the at least one host comprises a plurality of hosts, wherein the act (C)

comprises an act of creating the metadata on a control station, and wherein the act (D) comprises an act of transmitting the metadata from the control station to the plurality of storage devices, and from the plurality of storage devices to the plurality of hosts; and wherein the act (A) comprises an act of creating the virtual data storage object to comprise a plurality of data images, wherein the act (D) comprises an act of storing within each one of the plurality of storage devices a list of which ones of the plurality of hosts has accessed a data image stored within the one of the plurality of storage devices, and when the metadata on the one of the plurality of storage devices is updated, transmitting updated metadata from the one of the plurality of storage devices to the ones of the plurality of hosts in its list.

18. A computer readable medium encoded with a program for execution on a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource and a file system that presents at least one file to other layers in the host as a storage resource, the program, when executed on the computer system, performs a method of managing a virtual data storage object, the method comprising acts of:

(A) creating the virtual data storage object to be independent of any particular host and any particular storage device;

(B) creating the virtual data storage object so that at least one of the at least one logical volume and the at least one file is employed as a storage resource to store data stored to the virtual data storage object;

(C) receiving a set of parameters that defines a plurality of data images for the virtual data storage object and a manner in which the plurality of data images are interrelated; and (D) automatically assigning the storage resources within the computer system to store each of the plurality of data images.

19. The computer readable medium of claim 18, wherein the method further includes acts of:

(E) creating metadata defining the virtual data storage object; and (F) distributing the metadata about the computer system so that there is no central location that is the exclusive resource for accessing the metadata.

20. The computer readable medium of claim 19, wherein the at least one storage device comprises a plurality of storage devices, and wherein the act (F) comprises an act of distributing the metadata among each of the plurality of storage devices that stores data stored to the virtual data storage object.

21. The computer readable medium of claim 20, wherein the act (F) comprises an act of distributing only a subset of the metadata to at least one of the plurality of storage devices.

22. The computer readable medium of claim 19, wherein the at least one host comprises a plurality of hosts, and wherein the act (F) comprises an act of distributing the metadata among each of the plurality of hosts that accesses the virtual data storage object.

23. The computer readable medium of claim 22, wherein the act (F) comprises an act of distributing only a subset of the metadata to at least one of the plurality of hosts.

24. The computer readable medium of claim 18, wherein the act (B) comprises an act of creating the virtual data storage object so that the at least one logical volume is employed as a storage resource to store data stored to the virtual data storage object.

25. The computer readable medium of claim 18, wherein the act (B) comprises an act of creating the virtual data storage object so that the at least one file is employed as a storage resource to store data stored to the virtual data storage object.

26. The computer readable medium of claim 18, wherein the at least one host comprises first and second hosts, wherein the first host comprises a first LVM and the second host comprises a second LVM, wherein the act (B) comprises an act of creating the virtual data storage object to comprise at least first and second data images, with the first data image being stored on a logical volume presented by the first LVM and the second data image being stored on a logical volume presented by the second LVM.

27. The computer readable medium of claim 18, wherein the at least one logical volume comprises a plurality of logical volumes, wherein the at least one storage disk comprises a plurality of storage disks, and wherein the act (B) comprises an act of creating the virtual data storage object to comprise at least first and second data images, with the first data image being stored on one of the plurality of logical volumes and the second data image being stored on one of the plurality of storage disks.

28. The computer readable medium of claim 18, wherein the at least one storage device comprises a plurality of storage devices, and wherein the act (D) comprises an act of considering performance and functionality characteristics of the plurality of storage devices in making the automatic assignment.

29. A control station for use in a computer system including at least one host and at least one storage device that stores data written by the at least one host, the at least one storage device presenting at least one storage disk to the at least one host as a storage resource, the at least one host including at least one of a logical volume manager (LVM) that presents at least one logical volume to other layers in the host as a storage resource or a file system that presents at least one file to other layers in the host as a storage resource, the control station to manage a virtual data storage object, the control station comprising:

a storage medium; and at least one controller that creates the virtual data storage object to be independent of any particular host and any particular storage device, and so that at least one of the at least one logical volume and the at least one file is employed as a storage resource to store data stored to the virtual data storage object;

wherein the at least one controller receives a set of parameters that defines a plurality of data images for the virtual data storage object and a manner in which the plurality of data images are interrelated, and automatically assigns the storage resources within the computer system to store each of the plurality of data images.

30. The control station of claim 29, wherein the at least one controller creates metadata defining the virtual data storage object and distributes the metadata about the computer system so that there is no central location that is the exclusive resource for accessing the metadata.

31. The control station of claim 30, wherein the at least one storage device comprises a plurality of storage devices, and wherein the at least one controller distributes the metadata among each of the plurality of storage devices that stores data stored to the virtual data storage object.

32. The control station of claim 31, wherein the at least one controller distributes only a subset of the metadata to at least one of the plurality of storage devices.

33. The control station of claim 30, wherein the at least one host comprises a plurality of hosts, and wherein the at least one controller distributes the metadata among each of the plurality of hosts that accesses the virtual data storage object.

34. The control station of claim 33, wherein the at least one controller distributes only a subset of the metadata to at least one of the plurality of hosts.

35. The control station of claim 29, wherein the at least one controller creates the virtual data storage object so that the at least one logical volume is employed as a storage resource to store data stored to the virtual data storage object.

36. The control station of claim 29, wherein the at least one controller creates the virtual data storage object so that the at least one file is employed as a storage resource to store data stored to the virtual data storage object.

37. The control station of claim 29, wherein the at least one host comprises first and second hosts, wherein the first host comprises a first LVM and the second host comprises a second LVM, wherein the at least one controller creates the virtual data storage object to comprise at least first and second data images, with the first data image being stored on a logical volume presented by the first LVM and the second data image being stored on a logical volume presented by the second LVM.

38. The control station of claim 29, wherein the at least one logical volume comprises a plurality of logical volumes, wherein the at least one storage disk comprises a plurality of storage disks, and wherein the at least one controller creates the virtual data storage object to comprise at least first and second data images, with the first data image being stored on at least in part on one of the plurality of logical volumes and the second data image being stored at least in part on one of the plurality of storage disks.

39. The control station of claim 29, wherein the at least one storage device comprises a plurality of storage devices, and wherein the at least one controller considers performance and functionality characteristics of the plurality of storage devices in making the automatic assignment.

40. The control station of claim 29, wherein the at least one controller includes means for creating the virtual data storage object to be independent of any particular host and any particular storage device, and so that at least one of the at least one logical volume and the at least one file is employed as a storage resource to store data stored to the virtual data storage object.

41. A host computer for use in a computer system including the host computer and at least one storage device that stores data written by the host computer, the at least one storage device presenting at least one storage disk to the host computer as a storage resource, the host computer comprising:
- at least one software layer that issues access requests to a virtual data storage object that is independent of the host computer and any particular storage device;
- at least one of a logical volume manager (LVM) that presents at least one logical volume to other software layers in the host as a storage resource or a file system that presents at least one file to other software layers in the host as a storage resource; and
- at least one conversion layer that converts at least one access request directed to the virtual data storage object to an access request directed to at least one of the at least one logical volume and the at least one file;

wherein the virtual data storage object comprises at least first and second data images;

wherein the host computer comprises a logical volume manager that presents a plurality of logical volumes to other layers in the host computer;

wherein the at least one storage device presents a plurality of storage disks to the host computer; and wherein the at least one conversion layer converts an access request directed to the virtual data storage object to an access request directed to one of the first and second data images, converts an access request directed to the first data image to an access request directed to one of the plurality of logical volumes, and converts an access request directed to the second data image to an access request directed to one of the plurality of storage disks.

42. The host computer of claim 41, further including a presenter layer that presents the virtual data storage object to other layers in the host as a storage disk.

43. The host computer of claim 41, further including an LVM that presents the virtual data storage object to other layers in the host as a logical volume.

44. The host computer of claim 41, further including a file system that presents the virtual data storage object to other layers in the host as a file.

45. The host computer of claim 41, wherein the virtual data storage object is defined by metadata, and wherein the host computer further includes a storage medium that stores at least some of the metadata defining the virtual data storage object.

46. The host computer of claim 45, wherein the storage medium stores only a subset of the metadata that defines the virtual data storage object.

47. The host computer of claim 41, wherein the host includes at least one controller that performs a selection process to select which of the first and second data images to employ in responding to an access request to the virtual data storage object.

48. The host computer of claim 41, wherein the host computer comprises the logical volume manager (LVM) that presents at least one logical volume to other software layers in the host as a storage resource, and wherein the at least one conversion layer converts at least one of the access requests directed to the virtual data storage object to an access request directed to at least one logical volume.

49. The host computer of claim 41, wherein the host computer comprises the file system that presents at least one file to other software layers in the host as a storage resource, and wherein the at least one conversion layer converts at least one of the access requests directed to the virtual data storage object to an access request directed to at least one file.

50. The host computer of claim 41, wherein the at least one conversion layer includes means for converting at least one access request directed to the virtual data storage object to an access request directed to at least one of the at least one logical volume and the at least one file.

51. A method for use in a computer system including at least one host and at least one storage device that stores data written by the at least one host, the method comprising acts of:
(A) creating metadata defining a virtual data storage object that is independent of any particular host and any particular storage device; and (B) distributing the metadata about the computer system so that there is no central location that is the exclusive resource for accessing the metadata;

wherein the at least one storage device comprises a plurality of storage devices, wherein the at least one host comprises a plurality of hosts, wherein the act (A) comprises an act of creating the metadata on a control station, and wherein the act (B) comprises an act of transmitting the metadata from the control station to the plurality of storage devices, and from the plurality of storage devices to the plurality of hosts; and wherein the virtual data storage object comprises a plurality of data images, wherein the act (B) comprises an act of storing within each one of the plurality of storage devices a list of which ones of the plurality of hosts has accessed a data image stored within the one of the plurality of storage devices, and when the metadata on the one of the plurality of storage devices is updated, transmitting updated metadata from the one of the plurality of storage devices to the ones of the plurality of hosts in its list.

52. The method of claim 51, wherein the at least one storage device comprises a plurality of storage devices, and wherein the act (B) comprises an act of distributing the metadata among each of the plurality of storage devices that stores data stored to the virtual data storage object.

53. The method of claim 51, wherein the act (B) comprises an act of distributing only a subset of the metadata to at least one of the plurality of storage devices.

54. The method of claim 51, wherein the at least one host comprises a plurality of hosts, and wherein the act (B) comprises an act of distributing the metadata among each of the plurality of hosts that accesses the virtual data storage object.

55. The method of claim 54, wherein the act (B) comprises an act of distributing only a subset of the metadata to at least one of the plurality of hosts.

56. A method for use in a computer system including at least one host and at least one storage device that stores data written by the at least one host, the method comprising acts of:

(A) creating metadata defining a virtual data storage object that is independent of any particular host and any particular storage device; and (B) distributing the metadata about the computer system so that there is no central location that is the exclusive resource for accessing the metadata;

wherein the act (A) includes acts of:

receiving a set of parameters that defines a plurality of data images for the virtual data storage object and a manner in which the plurality of data images are interrelated; and automatically assigning the storage resources within the computer system to store each of the plurality of data images.

57. The method of claim 56, wherein the at least one storage device comprises a plurality of storage devices, wherein the at least one host comprises a plurality of hosts, wherein the act (A) comprises an act of creating the metadata on a control station, and wherein the act (B) comprises an act of transmitting the metadata from the control station to the plurality of storage devices, and from the plurality of storage devices to the plurality of hosts.

58. The method of claim 56, wherein the at least one storage device comprises a plurality of storage devices, and wherein the act of automatically assigning comprises an act of considering performance and functionality characteristics of the plurality of storage devices in making the automatic assignment.

59. A computer readable medium encoded with a program for execution on a computer system including at least one host and at least one storage device that stores data written by the at least one host, the program, when executed on the computer system performs a method comprising acts of:

(A) creating metadata defining a virtual data storage object that is independent of any particular host and any particular storage device; and (B) distributing the metadata about the computer system so that there is no central location that is the exclusive resource for accessing the metadata;

wherein the at least one storage device comprises a plurality of storage devices, wherein the at least one host comprises a plurality of hosts, wherein the act (A) comprises an act of creating the metadata on a control station, and wherein the act (B) comprises an act of transmitting the metadata from the control station to the plurality of storage devices, and from the plurality of storage devices to the plurality of hosts; and wherein the virtual data storage object comprises a plurality of data images, wherein the act (B) comprises an act of storing within each one of the plurality of storage devices a list of which ones of the plurality of hosts has accessed a data image stored within the one of the plurality of storage devices, and when the metadata on the one of the plurality of storage devices is updated, transmitting updated metadata from the one of the plurality of storage devices to the ones of the plurality of hosts in its list.

60. A computer readable medium encoded with a program for execution on a computer system including at least one host and at least one storage device that stores data written by the at least one host, the program, when executed on the computer system, performs a method comprising acts of:

(A) creating metadata defining a virtual data storage object that is independent of any particular host and any Particular storage device; and (B) distributing the metadata about the computer system so that there is no central location that is the exclusive resource for accessing the metadata;

wherein the act (A) includes acts of:

receiving a set of parameters that defines a plurality of data images for the virtual data storage object and a manner in which the plurality of data images are interrelated; and automatically assigning the storage resources within the computer system to store each of the plurality of data images.

61. The computer readable medium of claim 60, wherein the at least one storage device comprises a plurality of storage devices, and wherein the act (B) comprises an act of distributing the metadata among each of the plurality of storage devices that stores data stored to the virtual data storage object.

62. The computer readable medium of claim 60, wherein the act (B) comprises an act of distributing only a subset of the metadata to at least one of the plurality of storage devices.

63. The computer readable medium of claim 60, wherein the at least one host comprises a plurality of hosts, and wherein the act (B) comprises an act of distributing the metadata among each of the plurality of hosts that accesses the virtual data storage object.

64. The computer readable medium of claim 63, wherein the act (B) comprises an act of distributing only a subset of the metadata to at least one of the plurality of hosts.

65. The computer readable medium of claim 60, wherein the at least one storage device comprises a plurality of storage devices, wherein the at least one host comprises a plurality of hosts, wherein the act (A) comprises an act of creating the metadata on a control station, and wherein the act (B) comprises an act of transmitting the metadata from the control station to the plurality of storage devices, and from the plurality of storage devices to the plurality of hosts.

66. The computer readable medium of claim 60, wherein the at least one storage device comprises a plurality of storage devices, and wherein the act of automatically assigning comprises an act of considering performance and functionality characteristics of the plurality of storage devices in making the automatic assignment.

67. A control station for use in a computer system including at least one host and at least one storage device, the control station comprising:
  a user interface; and
  at least one controller that creates metadata defining a virtual data storage object that is independent of any particular host and any particular storage device, and that distributes the metadata about the computer system so that there is no central location that is the exclusive resource for accessing the metadata;
  wherein the at least one controller receives a set of parameters that defines a plurality of data images for the virtual data storage object and a manner in which the plurality of data images are interrelated, and wherein the at least one controller automatically assigns the storage resources within the computer system to store each of the plurality of data images.

68. The control station of claim 67, wherein the at least one storage device comprises a plurality of storage devices, and wherein the at least one controller distributes the metadata among each of the plurality of storage devices that stores data stored to the virtual data storage object.

69. The control station of claim 68, wherein the at least one controller distributes only a subset of the metadata to at least one of the plurality of storage devices.

70. The control station of claim 67, wherein the at least one host comprises a plurality of hosts, and wherein the at least one controller distributes the metadata among each of the plurality of hosts that accesses the virtual data storage object.

71. The control station of claim 70, wherein the at least one controller distributes only a subset of the metadata to at least one of the plurality of hosts.

72. The control station of claim 67, wherein the at least one storage device comprises a plurality of storage devices, and wherein the at least one controller considers performance and functionality characteristics of the plurality of storage devices in making the automatic assignment.

73. The control station of claim 67, wherein the at least one controller includes means for creating metadata defining a virtual data storage object that is independent of any particular host and any particular storage device, and means for distributing the metadata about the computer system so that there is no central location that is the exclusive resource for accessing the metadata.

74. A storage system for use in a computer system including at least one host and the storage system, the storage system to store data written by the at least one host, the at least one host storing a first copy of metadata for a virtual data storage object that is independent of any particular host and the storage system and that is stored using a storage resource on the storage system, the storage system comprising:
  the storage resource;
  a storage medium that stores a second copy of the metadata; and
  at least one controller that notifies the at least one host when the second copy of the metadata is updated so that the host can update the first copy of the metadata.

75. The storage system of claim 74, wherein the at least one controller further maintains a list of all hosts that access the virtual data storage object from the storage system.

76. A method of implementing a virtual data storage object in a computer system including at least one host and at least one storage device that stores data written by the at least one host, the virtual data storage object including at least one data image, at least one of the data image and the virtual data storage object having an attribute, the at least one storage device having at least one capability, the method comprising acts of:
  (A) considering the at least one capability of the at least one storage device when implementing the virtual data storage object; and
  (B) allocating at least one of the virtual data storage object and the at least one data image to be implemented on the at least one storage device so that the at least one capability of the at least one storage device is employed to implement the at least one attribute of the at least one of the virtual data storage object and the at least one data image.

77. The method of claim 76, wherein the at least one data image includes first and second data images, wherein the at least one attribute includes a mirror relationship between the first and second data images, and wherein the act (B) includes an act of allocating the first and second data images to utilize a mirroring capability of the at least one storage device.

78. The method of claim 77, wherein the mirror relationship is a local mirror relationship, and wherein the act (B) includes an act of allocating the first and second data images to a same storage device having local mirroring capability.

79. The method of claim 77, wherein the mirror relationship is a remote mirror relationship, and wherein the act (B) includes an act of allocating the first and second data images to first and second storage devices, respectively, each of the first and second storage devices having remote mirroring capability.

80. A computer readable medium encoded with a program for execution on a computer system including at least one host and at least one storage device that stores data written by the at least one host, the program for implementing a virtual data storage object including at least one data image, at least one of the data image and the virtual data storage object having an attribute, the at least one storage device having at least one capability, the method comprising acts of:
  (A) considering the at least one capability of the at least one storage device when implementing the virtual data storage object; and
  (B) allocating at least one of the virtual data storage object and the at least one data image to be implemented on the at least one storage device so that the at least one capability of the at least one storage device is employed to implement the at least one attribute of the at least one of the virtual data storage object and the at least one data image.

81. The computer readable medium of claim 80, wherein the at least one data image includes first and second data images, wherein the at least one attribute includes a mirror relationship between the first and second data images, and wherein the act (B) includes an act of allocating the first and second data images to utilize a mirroring capability of the at least one storage device.

82. The computer readable medium of claim 81, wherein the mirror relationship is a local mirror relationship, and wherein the act (B) includes an act of allocating the first and second data images to a same storage device having local mirroring capability.

83. The computer readable medium of claim 81, wherein the mirror relationship is a remote mirror relationship, and wherein the act (B) includes an act of allocating the first and second data images to first and second storage devices, respectively, each of the first and second storage device having remote mirroring capability.

* * * * *